United States Patent
Cameron

(10) Patent No.: US 7,400,271 B2
(45) Date of Patent: Jul. 15, 2008

(54) METHOD AND APPARATUS FOR PROCESSING CHARACTER STREAMS

(75) Inventor: Robert D. Cameron, Burnaby (CA)

(73) Assignee: International Characters, Inc., Vancouver (CA)

( * ) Notice: Subject to any disclaimer, the term of this patent is extended or adjusted under 35 U.S.C. 154(b) by 0 days.

(21) Appl. No.: 11/455,310

(22) Filed: Jun. 15, 2006

(65) Prior Publication Data

US 2006/0284745 A1 Dec. 21, 2006

Related U.S. Application Data

(60) Provisional application No. 60/692,683, filed on Jun. 21, 2005.

(51) Int. Cl.
*H03M 7/00* (2006.01)

(52) U.S. Cl. ......................................... 341/50; 341/51

(58) Field of Classification Search .................. 341/50, 341/51; 709/231, 225, 206; 715/853; 707/1; 717/116
See application file for complete search history.

(56) References Cited

U.S. PATENT DOCUMENTS

| | | | | |
|---|---|---|---|---|
| 6,049,869 A | | 4/2000 | Pickhardt et al. ............. 712/300 |
| 6,208,345 B1 * | | 3/2001 | Sheard et al. ................ 715/853 |
| 6,438,516 B1 | | 8/2002 | Davis ............................. 704/8 |
| 6,622,239 B1 | | 9/2003 | Wong et al. .................. 712/227 |
| 6,707,400 B2 | | 3/2004 | Christofferson et al. ...... 341/106 |
| 6,737,994 B2 | | 5/2004 | Davis et al. .................... 341/65 |
| 6,763,499 B1 | | 7/2004 | Friedman et al. ............. 715/513 |
| 6,772,413 B2 | | 8/2004 | Kuznetsov ................... 717/136 |
| 6,782,380 B1 | | 8/2004 | Thede ............................ 707/3 |
| 6,861,963 B1 | | 3/2005 | Steele et al. ................... 341/50 |
| 6,892,377 B1 * | | 5/2005 | White ......................... 717/116 |
| 2002/0184480 A1 | | 12/2002 | Sazegari ...................... 712/300 |
| 2003/0046353 A1 * | | 3/2003 | Chung et al. ................. 709/206 |
| 2004/0030781 A1 * | | 2/2004 | Etesse et al. ................. 709/225 |
| 2004/0044791 A1 * | | 3/2004 | Pouzzner ..................... 709/245 |
| 2004/0117499 A1 * | | 6/2004 | Liu et al. ..................... 709/231 |
| 2004/0187061 A1 | | 9/2004 | Matsuda ...................... 714/746 |
| 2005/0049997 A1 * | | 3/2005 | Shipp ............................ 707/1 |
| 2005/0147079 A1 * | | 7/2005 | Lakkis ........................ 370/350 |

OTHER PUBLICATIONS

W. Ambrus "A Framework for Automatic Parallelization of Sequential Programs" Proceedings of the 7th International Conference on Telecommunications—ConTEL 2003, vol. 2, pp. 693-696, Jun. 11-13, 2003.

(Continued)

*Primary Examiner*—Jean B Jeanglaude
(74) *Attorney, Agent, or Firm*—Michael B. Einschlag

(57) ABSTRACT

An embodiment is a method for processing a character stream including: (a) forming, responsive to the character stream, a plurality of parallel property bit streams wherein each of the parallel property bit streams includes bit values of a particular property associated with data values of the character stream; and (b) processing the parallel property bit streams. For example, the method applies to character streams encoded in accordance with fixed-width character encoding schemes, for example, ASCII, or variable length character encoding schemes, for example, UTF-8.

65 Claims, 15 Drawing Sheets

OTHER PUBLICATIONS

H. K. T. Wong et al. "Bit Transposed Files" Proceedings of VLDB 85, Stockholm, pp. 448-457, 1985, month unknown.

P. Apparao et al. "A Detailed Look at the Characteristics of XML Parsing" 2004 BEACON Workshop—1st Workshop on Building Block Engine Architectures for Comps and Networks, Boston, Mass, 2004.

H. S. Warren "7-3 Transposing a Bit Matrix and 7-4 Compress, or Generalized Extract" in Hacker's Delight, Addison-Wesley, 2003, pp. 108-122.

* cited by examiner

Parallel UTF-8 Data and Property Streams

| Text | $ | , |  | ¥ | , |  | € |  |  | ? |
|---|---|---|---|---|---|---|---|---|---|---|
| u8data($i$) | 0x24 | 0x2C | 0x20 | 0xC2 | 0xA5 | 0x2C | 0x20 | 0xE2 | 0x83 | 0xAC | 0x3F |
| u8bit0($i$) | 0 | 0 | 0 | 1 | 1 | 0 | 0 | 1 | 1 | 1 | 0 |
| u8bit1($i$) | 0 | 0 | 0 | 1 | 0 | 0 | 0 | 1 | 0 | 0 | 0 |
| u8bit2($i$) | 1 | 1 | 1 | 0 | 1 | 1 | 1 | 1 | 0 | 1 | 1 |
| u8bit3($i$) | 0 | 0 | 0 | 0 | 0 | 0 | 0 | 0 | 0 | 0 | 1 |
| u8bit4($i$) | 0 | 1 | 0 | 0 | 0 | 1 | 0 | 0 | 0 | 1 | 1 |
| u8bit5($i$) | 1 | 1 | 0 | 0 | 1 | 1 | 0 | 0 | 0 | 1 | 1 |
| u8bit6($i$) | 0 | 0 | 0 | 1 | 0 | 0 | 0 | 1 | 1 | 0 | 1 |
| u8bit7($i$) | 0 | 0 | 0 | 0 | 1 | 0 | 0 | 0 | 1 | 0 | 1 |
| u8prefix($i$) | 0 | 0 | 0 | 1 | 0 | 0 | 0 | 1 | 0 | 0 | 0 |
| u8prefix2($i$) | 0 | 0 | 0 | 1 | 0 | 0 | 0 | 0 | 0 | 0 | 0 |
| u8scope22($i$) | 0 | 0 | 0 | 0 | 1 | 0 | 0 | 0 | 0 | 0 | 0 |
| u8hi4($i$) | 0x2 | 0x2 | 0x2 | 0xC | 0xA | 0x2 | 0x2 | 0xE | 0x8 | 0xA | 0x3 |
| u8lo4($i$) | 0x4 | 0xC | 0x0 | 0x2 | 0x5 | 0xC | 0x0 | 0x2 | 0x3 | 0xC | 0xF |
| cpbyte($i$) | 0x24 | 0x2C | 0x20 | 0x00 | 0xA5 | 0x2C | 0x20 | 0x00 | 0x20 | 0xAC | 0x3F |
| $i$ | 0 | 1 | 2 | 3 | 4 | 5 | 6 | 7 | 8 | 9 | 10 |

FIG. 1

Altivec Code Fragment Illustrating Shift Across Block and Buffer Boundaries

```
// initialize constants for shifts
vector unsigned char shift1 = vec_splat_u8(1);
vector unsigned char shift3 = vec_splat_u8(3);
vector unsigned char shift7 = vec_splat_u8(7);
vector unsigned char byte_shift15 = vec_sl(vec_splat_u8(15), shift3);
...
oldprefix2 = ...;// value for last block of previous buffer.
for (i = 0; i < block_count; i++) {
  u8_prefix = vec_and(u8bit0[i], u8bit1[i]);
  thisprefix2 = vec_andc(u8prefix, u8bit2[i]);
  u8scope22 = vec_or(vec_sll(vec_slo(oldprefix2, byte_shift15), shift7),
                     vec_srl(thisprefix2, shift1));
  ...
  ...
  oldprefix2 = thisprefix2; // prepare next iteration
}
```

FIG. 2.

Serial Byte Stream to Parallel Bit Stream Transposition Using Idealized SIMD Instruction Set

```
// Temporary registers:
// bit0123_r0 ... bit0123_r3 for high nybbles of each byte.
// bit4567_r0 ... bit4567_r3 for low nybbles of each byte.
// bit01_r0, bit01_r1, ... bit67_r1 for bit pairs.
bit0123_r0 = simd_pack/8(u8data_r0/h, u8data_r1/h);
bit0123_r1 = simd_pack/8(u8data_r2/h, u8data_r3/h);
bit0123_r2 = simd_pack/8(u8data_r4/h, u8data_r5/h);
bit0123_r3 = simd_pack/8(u8data_r6/h, u8data_r7/h);
bit4567_r0 = simd_pack/8(u8data_r0/l, u8data_r1/l);
bit4567_r1 = simd_pack/8(u8data_r2/l, u8data_r3/l);
bit4567_r2 = simd_pack/8(u8data_r4/l, u8data_r5/l);
bit4567_r3 = simd_pack/8(u8data_r6/l, u8data_r7/l);
bit01_r0 = simd_pack/4(bit0123_r0/h, bit0123_r1/h);
bit01_r1 = simd_pack/4(bit0123_r2/h, bit0123_r3/h);
bit23_r0 = simd_pack/4(bit0123_r0/l, bit0123_r1/l);
bit23_r1 = simd_pack/4(bit0123_r2/l, bit0123_r3/l);
bit45_r0 = simd_pack/4(bit4567_r0/h, bit4567_r1/h);
bit45_r1 = simd_pack/4(bit4567_r2/h, bit4567_r3/h);
bit67_r0 = simd_pack/4(bit4567_r0/l, bit4567_r1/l);
bit67_r1 = simd_pack/4(bit4567_r2/l, bit4567_r3/l);
u8bit0 = simd_pack/2(bit01_r0/h, bit01_r1/h);
u8bit1 = simd_pack/2(bit01_r0/l, bit01_r1/l);
u8bit2 = simd_pack/2(bit23_r0/h, bit23_r1/h);
u8bit3 = simd_pack/2(bit23_r0/l, bit23_r1/l);
u8bit4 = simd_pack/2(bit45_r0/h, bit45_r1/h);
u8bit5 = simd_pack/2(bit45_r0/l, bit45_r1/l);
u8bit6 = simd_pack/2(bit67_r0/h, bit67_r1/h);
u8bit7 = simd_pack/2(bit67_r0/l, bit67_r1/l);
```

FIG. 3

Altivec Code Fragment for Bit Pairing

```
// initialize constants for packing, shifting, masking.
vector unsigned char even_indices = vec_add(vec_lvsl(0,0), vec_lvsl(0,0));
vector unsigned char shift1 = vec_splat_u8(1);
vector unsigned char shift4 = vec_splat_u8(4);
vector unsigned char mask_0101 = vec_splat_u8(0x05);
vector unsigned char alternate_bits =
   vec_or(mask_0101, vec_sl(mask_0101, shift4));
vector unsigned char even, odd, even_left1, odd_right1;
..
..
// Assume that two consecutive sets of 16 input bytes are available
// in registers u8data0 and u8data1.  Pack into even and odd bytes.
even = vec_perm(u8data0, u8data1, even_indices);
odd  = vec_pack((vector unsigned short) u8data0,
                (vector unsigned short) u8data1);
// Now make offset 1 versions.
even_left1 = vec_sl(even, shift1);
odd_right1 = vec_sr(odd, shift1);
//
bits00224466 = vec_sel(even, odd_right1, alternate_bits);
bits11335577 = vec_sel(even_left1, odd, alternate_bits);
// Stage 1 bit pairing complete.
```

FIG. 4

Altivec Code Fragment for Bit Detection

```
int has_bit(vector unsigned char bit_block[], int block_count) {
   vector unsigned char accum = vec_splat_u8(0);
   int i;
   for (i = 0; i < block_count; i++) {
      accum = vec_or(bit_block[i], accum);
   }
   return accum_sum((vector unsigned int) accum) > 0;
}
```

FIG. 5

Pentium Code Fragment for Bit Position Arrays

```
asm volatile(
  "b2p_next_32:\n\t"
  "cmpl %[buffer_end_ptr], %[bit_buffer_ptr]\n\t"
  "jge b2p_finish\n"
  "b2p_scan_next:\n\t"
  "bsf (%[bit_buffer_ptr]), %%ecx\n\t"   // initiate bit scan
  // bsf has a latency of 4; load the current 32 bits and
  // advance counters in the meantime.  Use leal for arithmetic
  // to avoid conflict with the z flag set by bsf.
  "movl (%[bit_buffer_ptr]), %%eax\n\t"  // load current 32 bits
  "leal 32(%[bit_position]), %[bit_position]\n\t"
  "leal 4(%[bit_buffer_ptr]), %[bit_buffer_ptr]\n\t"
  "jz b2p_next_32\n"              // did bsf find a bit?
  "b2p_process_bit:\n\t"
  "leal (%[bit_position], %%ecx), %%edx\n\t" // bit position = base + offset
  "leal -1(%%eax), %%ecx\n\t"
  "andl %%ecx, %%eax\n\t"                 // clear bit
  "bsf %%eax, %%ecx\n\t"                  // start another scan
  "movw %%dx, (%[position_buffer_ptr])\n\t" // store the position just found
  "leal 2(%[position_buffer_ptr]), %[position_buffer_ptr]\n\t"
  "jnz b2p_process_bit\n\t"
  "cmpl %[buffer_end_ptr], %[bit_buffer_ptr]\n\t"
  "jl b2p_scan_next\n"
  "b2p_finish:\n"
  : [position_buffer_ptr] "+D" (position_buffer_ptr)
  : [bit_buffer_ptr] "S" (bit_buffer_ptr),
    [bit_position] "b" (bit_position-32),  // will preincrement by 32.
    [buffer_end_ptr] "m" (buffer_end_ptr)
  : "eax", "ecx", "edx", "cc", "memory");
```

FIG. 6

Parallel Bit Stream to Serial Byte Stream Transposition Using Idealized SIMD Instruction Set

```
// Temporary registers:
// bit01_r0, bit01_r1, ... bit67_r1 for merged bit pairs.
// bit0123_r0 ... bit0123_r3 for high nybbles of each byte.
// bit4567_r0 ... bit4567_r3 for low nybbles of each byte.
bit01_r0 = simd_mergeh/1(u8bit0, u8bit1);
bit01_r1 = simd_mergel/1(u8bit0, u8bit1);
bit23_r0 = simd_mergeh/1(u8bit2, u8bit3);
bit23_r1 = simd_mergel/1(u8bit2, u8bit3);
bit45_r0 = simd_mergeh/1(u8bit4, u8bit5);
bit45_r1 = simd_mergel/1(u8bit4, u8bit5);
bit67_r0 = simd_mergeh/1(u8bit6, u8bit7);
bit67_r1 = simd_mergel/1(u8bit6, u8bit7);
bit0123_r0 = simd_mergeh/2(bit01_r0, bit23_r0);
bit0123_r1 = simd_mergel/2(bit01_r0, bit23_r0);
bit0123_r2 = simd_mergeh/2(bit01_r1, bit23_r1);
bit0123_r3 = simd_mergel/2(bit01_r1, bit23_r1);
bit4567_r0 = simd_mergeh/2(bit45_r0, bit67_r0);
bit4567_r1 = simd_mergel/2(bit45_r0, bit67_r0);
bit4567_r2 = simd_mergeh/2(bit45_r1, bit67_r1);
bit4567_r3 = simd_mergel/2(bit45_r1, bit67_r1);
u8data_r0 = simd_mergeh/4(bit0123_r0, bit4567_r0);
u8data_r1 = simd_mergel/4(bit0123_r0, bit4567_r0);
u8data_r2 = simd_mergeh/4(bit0123_r1, bit4567_r1);
u8data_r3 = simd_mergel/4(bit0123_r1, bit4567_r1);
u8data_r4 = simd_mergeh/4(bit0123_r2, bit4567_r2);
u8data_r5 = simd_mergel/4(bit0123_r2, bit4567_r2);
u8data_r6 = simd_mergeh/4(bit0123_r3, bit4567_r3);
u8data_r7 = simd_mergel/4(bit0123_r3, bit4567_r3);
```

FIG. 7

UTF-8 Code Unit Sequences and Corresponding Code Point Bytes

| | byte class | | | | u8unibyte |
|---|---|---|---|---|---|
| Single byte | UTF-8 pattern | | | | 0tuvwxyz |
| | code point | | | | 0tuvwxyz |
| | byte class | | | u8prefix2 | u8scope22 |
| 2-byte sequence | UTF-8 pattern | | | 110pqrst | 10uvwxyz |
| | code point | | | 00000pqr | stuvwxyz |
| | byte class | | u8prefix3 | u8scope32 | u8scope33 |
| 3-byte sequence | UTF-8 pattern | | 1110jklm | 10npqrst | 10uvwxyz |
| | code point | | 00000000 | jklmnpqr | stuvwxyz |
| | byte class | u8prefix4 | u8scope42 | u8scope43 | u8scope44 |
| 4-byte sequence | UTF-8 pattern | 11110efg | 10hijklm | 10npqrst | 10uvwxyz |
| | code point | 00000000 | 000efghi | jklmnpqr | stuvwxyz |

FIG. 8

UTF-8 to UTF-16 Bit Space Transcoder

UTF-8 Code Unit Sequences and Corresponding UTF-16 High and Low Bytes

| | | | | | |
|---|---|---|---|---|---|
| Single byte | byte class | | | | u8unibyte |
| | UTF-8 pattern | | | | 0tuvwxyz |
| | u16hi | | | | 00000000 |
| | u16lo | | | | 0tuvwxyz |
| 2-byte sequence | byte class | | | u8prefix2 | u8scope22 |
| | UTF-8 pattern | | | 110pqrst | 10uvwxyz |
| | u16hi | | | *delete* | 00000pqr |
| | u16lo | | | *delete* | stuvwxyz |
| 3-byte sequence | byte class | | u8prefix3 | u8scope32 | u8scope33 |
| | UTF-8 pattern | | 1110jklm | 10npqrst | 10uvwxyz |
| | u16hi | | *delete* | *delete* | jklmnpqr |
| | u16lo | | *delete* | *delete* | stuvwxyz |
| 4-byte sequence | byte class | u8prefix4 | u8scope42 | u8scope43 | u8scope44 |
| | UTF-8 pattern | 11110efg | 10hijklm | 10npqrst | 10uvwxyz |
| | u16hi | *delete* | 110110ab | *delete* | 110111qr |
| | u16lo | *delete* | cdjklmnp | *delete* | stuvwxyz |

(where abcd = efghi - 1)

FIG. 11

Altivec Implementation of Idealized Instruction simd_add_16

```
// simd_add_16 macros make the following assumptions.
// rslt, a, b are all either vector unsigned short or vector signed short.
// hshift8 is predefined as a vec_splat_u16(8)
// alt_bytes is predefined as vec_vsrh(vec_splat_u16(-1), hshift8)
//
#define simd_add_16_xx(rslt, a, b) rslt = vec_adduhm(a, b)

#define simd_add_16_xh(rslt, a, b) \
   rslt = vec_adduhm(a, vec_vsrh(b, hshift8))

#define simd_add_16_xl(rslt, a, b) \
   rslt = vec_adduhm(a, vec_and(b, alt_bytes))

#define simd_add_16_hx(rslt, a, b) \
   rslt = vec_adduhm(vec_vsrh(a, hshift8), b)

#define simd_add_16_hh(rslt, a, b) \
   rslt = vec_adduhm(vec_vsrh(a, hshift8), vec_vsrh(b, hshift8))

#define simd_add_16_hl(rslt, a, b) \
   rslt = vec_adduhm(vec_vsrh(a, hshift8), vec_and(b, alt_bytes))

#define simd_add_16_lx(rslt, a, b) \
   rslt = vec_adduhm(vec_and(a, alt_bytes), b)

#define simd_add_16_lh(rslt, a, b) \
   rslt = vec_adduhm(vec_and(a, alt_bytes), vec_vsrh(b, hshift8))

#define simd_add_16_ll(rslt, a, b) \
   rslt = vec_adduhm(vec_and(a, alt_bytes), vec_and(b, alt_bytes))
```

FIG. 12

Altivec Implementation of Idealized Instruction simd_srl_4

```
// simd_srl_4 macros make the following assumptions.
// rslt, a, b are all vector unsigned char.
// shift2 is predefined as a vec_splat_u8(2)
// shift4 is predefined as a vec_splat_u8(4)
// alt_pairs is predefined as
//    vec_or(vec_splat_u8(3), vec_sl(vec_splat_u8(3), shift4))
// alt_nybbles is predefined as vec_splat_u8(15)
//
#define simd_srl_4_xx(rslt, a, b) \
  do { \
    vector unsigned char x = a; /* Ensure a is evaluated once only. */ \
    vector unsigned char y = vec_and(b, alt_pairs); /* max shift = 3 */ \
    vector unsigned char rslt_h = vec_vsrb(x, vec_vsrb(y, shift4)); \
    vector unsigned char rslt_l = vec_vsrb(vec_and(x, alt_nybbles), y); \
    rslt = vec_sel(rslt_h, rslt_l, alt_nybbles); \
  } while (0)

#define simd_srl_4_xh(rslt, a, b) \
  simd_srl_4_xx(rslt, a, vec_vsrb(b, shift2))

define simd_srl_4_xl simd_srl_4_xx define simd_srl_4_hx(rslt, a, b) \
  simd_srl_4_xx(rslt, vec_and(vec_vsrb(a, shift2), alt_pairs), b)

#define simd_srl_4_hh(rslt, a, b) \
  simd_srl_4_hx(rslt, a, vec_vsrb(b, shift2))

define simd_srl_4_hl simd_srl_4_hx define simd_srl_4_lx(rslt, a, b) \
  simd_srl_4_xx(rslt, vec_and(a, alt_pairs), b)

#define simd_srl_4_lh(rslt, a, b) \
  simd_srl_4_xx(rslt, vec_and(a, alt_pairs), vec_vsrb(b, shift2))

#define simd_srl_4_ll simd_srl_4_lx
```

FIG. 13

Altivec Implementation of Idealized Instruction simd_sub_2

```
// simd_sub_2 macros make the following assumptions.
// rslt, a, b are all vector unsigned char.
// shift1 is predefined as a vec_splat_u8(1)
// alt_bits is predefined as
//    vec_or(vec_splat_u8(5), vec_sl(vec_splat_u8(5), shift4))
//
#define simd_sub_2_xx(rslt, a, b) \
  do {vector unsigned char x = a; /* Evaluate a once only. */ \
      vector unsigned char y = b; /* Evaluate b once only. */ \
      vector unsigned char bit_diff = vec_xor(a, b); \
      vector unsigned char borrow = vec_vslb(vec_andc(b, a), shift1); \
      rslt = vec_sel(vec_xor(bit_diff, borrow), bit_diff, alt_bits); \
  } while (0)

#define simd_sub_2_xh(rslt, a, b) \
  simd_sub_2_xx(rslt, a, vec_and(vec_vsrb(b, shift1), alt_bits))

#define simd_sub_2_xl(rslt, a, b) simd_sub_2_xx(rslt, a, vec_and(b, alt_bits))

#define simd_sub_2_hx(rslt, a, b) \
  simd_sub_2_xx(rslt, vec_and(vec_vsrb(a, shift1), alt_bits), b)

#define simd_sub_2_lx(rslt, a, b) simd_sub_2_xx(rslt, vec_and(a, alt_bits), b)

// Optimized versions.
#define simd_sub_2_hh(rslt, a, b) \
  do {vector unsigned char x = a; /* Evaluate a once only. */ \
      vector unsigned char y = b; /* Evaluate b once only. */ \
      rslt = vec_sel(vec_andc(b, a), vec_vsrb(vec_xor(a, b), shift1),
alt_bits);
  } while (0)

#define simd_sub_2_hl(rslt, a, b) \
  do {vector unsigned char x = a; /* Evaluate a once only. */ \
      vector unsigned char y = b; /* Evaluate b once only. */ \
      rslt = vec_sel(vec_andc(vec_vslb(b, shift1), a), \
                     vec_xor(vec_vsrb(a, shift1), b), alt_bits);
  } while (0)

#define simd_sub_2_lh(rslt, a, b) \
  do {vector unsigned char x = a; /* Evaluate a once only. */ \
      vector unsigned char y = b; /* Evaluate b once only. */ \
      rslt = vec_sel(vec_andc(b, vec_vslb(a, shift1)), \
                     vec_xor(a, vec_vsrb(b, shift1), alt_bits);
  } while (0)

#define simd_sub_2_ll(rslt, a, b) \
  do {vector unsigned char x = a; /* Evaluate a once only. */ \
      vector unsigned char y = b; /* Evaluate b once only. */ \
      rslt = vec_sel(vec_vslb(vec_andc(b, a), shift1), \
                     vec_xor(a, b), alt_bits);
  } while (0)
```

FIG. 14

METHOD AND APPARATUS FOR PROCESSING CHARACTER STREAMS

This patent application relates to U.S. Provisional Application No. 60/692,683 filed Jun. 21, 2005, from which priority is claimed under 35 USC §119(e), and which provisional application is incorporated herein in its entirety.

TECHNICAL FIELD OF THE INVENTION

One or more embodiments of the present invention relate to method and apparatus for processing character streams.

BACKGROUND OF THE INVENTION

Text processing applications deal with textual data encoded as strings or streams of characters following conventions of a particular character encoding scheme. Historically, many text processing applications have been developed that are based on fixed-width, single-byte, character encoding schemes such as ASCII and EBCDIC. Further, text processing applications involving textual data in various European languages or non-Roman alphabets may use one of the 8-bit extended ASCII schemes of ISO 8859. Still further, a number of alternative variable-length encoding schemes have been used for Chinese, Japanese or Korean applications.

Increasingly, Unicode is being used as a basis for text processing applications that may need to accommodate, and/or perhaps combine, text arising from different sources. The Unicode character set is designed to include characters of all the world's languages, as well as many additional characters arising from formal notation systems used in mathematics, music and other application areas. As is well known, UTF-8, UTF-16 and UTF-32 are the three basic encoding schemes of Unicode that are based on 8-bit, 16-bit, or 32-bit code units, respectively. In particular, UTF-8 is a variable-length encoding scheme that requires one to four 8-bit code units per character; UTF-16 is an encoding scheme that generally requires a single 16-bit code unit per character (some rarely used characters require 2 code units); and UTF-32 is a fixed-length encoding scheme that requires a single 32-bit code unit for each character. UTF-16 and UTF-32 have variations known as UTF-16LE, UTF-16BE, UTF-32LE and UTF-32BE, depending on byte-ordering conventions within code units.

While Unicode allows interoperation between applications and character streams from many different sources, it comes at some cost in processing efficiency when compared with legacy applications based on 8-bit character encoding schemes. This cost may become manifest in the form of additional hardware required to achieve desired throughput, additional energy consumption in carrying out an application on a particular character stream, and/or additional execution time for an application to complete processing.

Applications may further require that the content of data streams be structured according to lexical and/or syntactic conventions of a text-based notation system. Many such conventions exist, ranging from simple line-oriented structuring conventions used by various operating systems to formal programming language grammars used for representing computer programs as source language texts. Of special importance is the growing use of XML as a standard, text-based, markup language for encoding documents and data of all kinds. In each case, the imposition of structuring information may add considerably to resource requirements of relevant text processing applications.

In general, high-speed text processing in the prior art uses sequential, character-at-a-time (or byte-at-a-time) processing, often written in the C programming language. For example, much prior art for XML and Unicode string processing teaches use of the sequential character processing approach. This is also true of standard computing science textbooks dealing with parsing, lexical analysis, and text processing applications.

There are three basic techniques used in the prior art for implementing text processing applications. The first basic technique is a hand-coded implementation using iterative looping (for example, while loops) and branching instructions (for example, if-statements) to perform conditional actions based on particular characters or character classes. The second basic technique is a variation of the first in which decomposition of separate logic for different characters or character classes is handled through jump tables (for example, case statements). The third basic technique systematizes the use of tables in the form of finite state machines. Finite state machine implementations derive from standard theoretical techniques for string processing; namely, representing character and lexical syntax by regular expression grammars and recognizing character strings matching these grammars using finite automata. Finite state machine techniques can give efficient implementations when the number of states and the number of potential character transitions per state is reasonably small; for example, applications involving 7-bit ASCII processing require at most 128 entries per state. However, a straightforward implementation of finite state machines based on 16-bit representations of UTF-16 would require more than 64,000 entries per state. Thus, for state spaces of any complexity, this quickly becomes prohibitive.

Industry standard processors have evolved through 8-bit, 16-bit and 32-bit architectures. In addition, character encoding schemes have evolved from the 8-bit representations of extended ASCII through the 16-bit and 32-bit representations of UTF-16 and UTF-32. Through this period of evolution of processor architectures and character encoding schemes, there has been a rough match between processor capabilities and the requirements of character-at-a-time processing.

Although the evolution of character encoding has now likely reached a point of long-term stability through the Unicode standard, processor architectures are continuing to evolve. In particular, recent years have seen an increasing mismatch between processor capabilities and character-at-a-time processing requirements. Specifically, industry standard processor architectures now routinely include capabilities for single-instruction, multiple-data processing based on 128-bit registers, while processors with 64-bit general purpose registers are being increasingly deployed. These registers are potentially capable of dealing with a number of characters or code units at a time, for example, up to 16 UTF-8 code units could be processed using 128-bit registers. In addition, processors have developed sophisticated instruction and data caching facilities for increasing throughput. With respect to instruction caching, in particular, throughput advantages provided by pipelining are largely negated by sequential character processing software that is heavily laden with branch instructions for conditional character logic. Data cache behavior may also be a problem, particularly for finite-state machine and other table-based implementations that may use large transition or translation tables.

In light of the above, there is a need to provide method and/or apparatus to solve one or more of the above-identified issues.

SUMMARY OF THE INVENTION

One or more embodiments of the present invention satisfy one or more of the above-identified needs. In particular, one embodiment of the present invention is a method for processing a character stream including: (a) forming, responsive to the character stream, a plurality of parallel property bit streams wherein each of the parallel property bit streams comprises bit values of a particular property associated with data values of the character stream; and (b) processing the one or more parallel property bit streams.

BRIEF DESCRIPTION OF THE DRAWING

FIG. 1 illustrates UTF-8 code units and parallel property streams for a Unicode text "$, ¥, €?";

FIG. 2 shows a loop fragment illustrating shift across block and buffer boundaries using the C-language interface for Altivec programming on a Power PC in accordance with an embodiment of the present invention;

FIG. 3 illustrates serial byte to parallel bit stream transposition using an idealized instruction set architecture in accordance with an embodiment of the present invention;

FIG. 4 shows an Altivec code fragment implementing a serial to parallel transposition stage in accordance with an embodiment of the present invention;

FIG. 5 shows an Altivec code fragment for bit detection in accordance with an embodiment of the present invention;

FIG. 6 shows an inline assembly implementation (GCC conventions) for forming bit position arrays in accordance with one embodiment of the present invention suitable for a 32-bit Pentium architecture and compatible processors;

FIG. 7 illustrates parallel bit stream to serial byte transposition using an idealized instruction set architecture in accordance with an embodiment of the present invention;

FIG. 8 shows a correspondence between UTF-8 code unit sequences and code point values;

FIG. 11 shows a correspondence between UTF-8 code unit sequences and UTF-16 hi and lo byte data;

FIG. 12 shows an implementation of an idealized instruction simd_add_16 in accord with one embodiment of the invention using Power PC processors;

FIG. 13 shows an implementation of an idealized instruction simd_srl_4 in accord with one embodiment of the invention using Power PC processors;

FIG. 14 shows an implementation of an idealized instruction simd_sub_2 in accord with one embodiment of the invention using Power PC processors.

DETAILED DESCRIPTION

Figure 9:
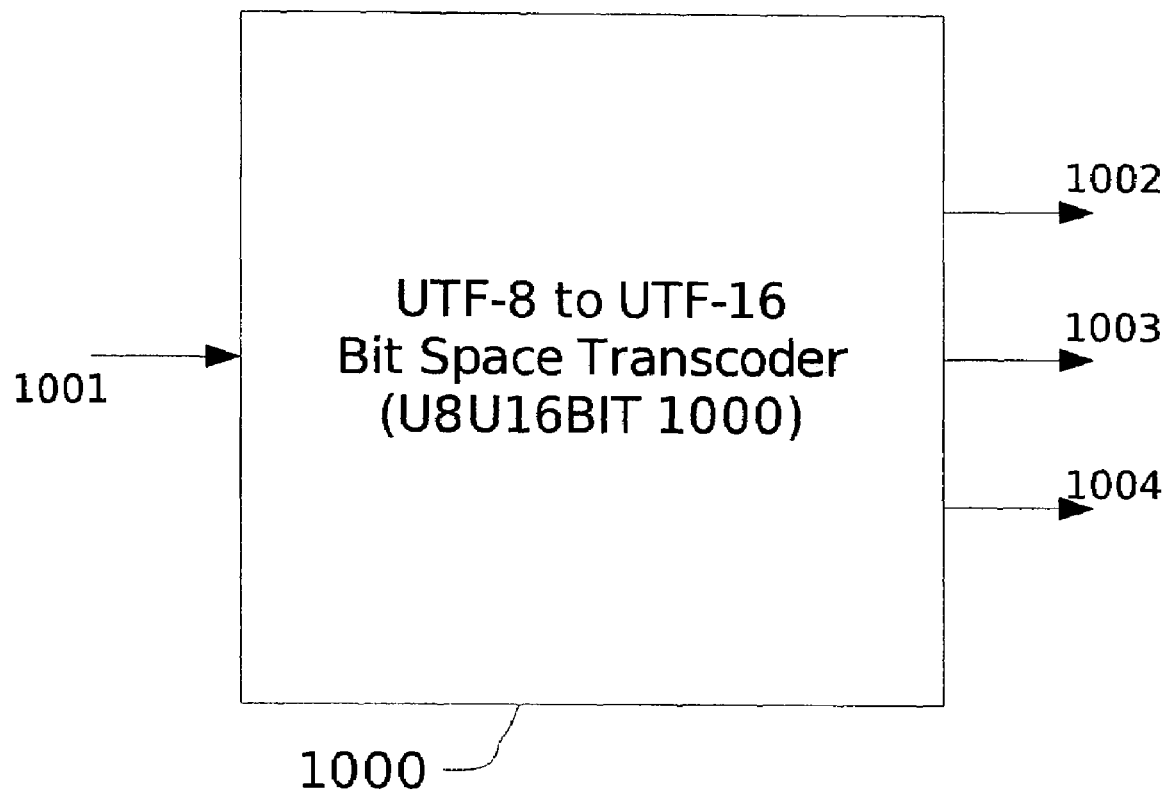
FIG. 9 shows a block diagram of an input-output structure of a UTF-8 to UTF-16 bit-space transcoder that is fabricated in accordance with one embodiment of the present invention.

Definitions: The following definitions apply herein.

Data stream: A sequence of data values of a particular data type. A data stream may be of finite length or it may be nonterminating.

Data string: A data stream of finite length that may be processed as a single entity.

Bit stream: A data stream consisting of bit values, i.e., values that are either 0 or 1.

Bit string: A bit stream of finite length that may be processed as a single entity.

Byte: A data unit consisting of 8 bits.

Character stream: A data stream consisting of character values in accordance with an encoding convention of a particular character encoding scheme.

Character encoding scheme: A scheme for encoding characters as data values each comprising one or more fixed-width code units.

Character string: A character stream of finite length that may be processed as a single entity.

Code point: A numeric value associated with a particular character in a character encoding scheme.

Code unit: An individual data unit in a character encoding scheme.

Doublebyte: A data unit consisting of 16 bits.

Lexical item stream. A bit stream parallel to a basis character stream that is constructed to identify positions of lexically significant characters or character combinations in accordance with rules of a textual notation system.

Nybble: A data unit consisting of 4 bits.

Property stream: A data stream consisting of data values of a particular property associated with data values from another data stream, where the another data stream is called a basis stream of the property stream.

Parallel data streams. Two or more data streams whose data values are in one-to-one correspondence. For example, parallel property streams are parallel data streams where the parallel data streams are property streams of a basis stream, for example, a character stream.

Text: Information in a form readable by people and represented as character string or character stream data in accordance with a particular character encoding scheme.

Textual notation system. A system for structuring and representing information as text, in accordance with a grammar or other set of rules. Programming languages, markup languages and character-based data formats are examples of textual notation systems.

1. Parallel Data Streams and Property Streams

One or more embodiments of the present invention involve manipulating parallel data streams including, but not limited to, using simultaneous-instruction, multiple-data ("SIMD") techniques to manipulate the parallel data streams. In particular, in accordance with one or more such embodiments, the parallel data streams may be property streams of a character stream (the basis stream) in, for example and without limitation, a UTF-8 representation, a UTF-16 representation, or a UTF-32 representation. An understanding of this may be illustrated through an example of parallel property streams generated from Unicode text encoded in UTF-8.

1.1 Parallel Property Streams Generated from Unicode Text Encoded in UTF-8

Consider a Unicode text "$, ¥, €?" comprising the following eight characters in sequence: dollar sign, comma, space, yen sign, comma, space, euro sign, question mark. FIG. 1 shows a UTF-8 data stream representing this text, together with a number of parallel property streams derived therefrom. Using hexadecimal notation, the row labeled u8data(i) shows the composition of the UTF-8 data stream as a sequence of 8-bit code units (bytes). Note that the yen sign and the euro sign respectively require two code units and three code units, so that the overall length of the UTF-8 data stream in this case is eleven code units. In general, given a UTF-8 data stream of N code units in all, u8data(i) denotes the code unit at position i, for positions 0 through N−1.

A UTF-8 data stream may be alternatively represented as a number of parallel property streams, for example, 8 parallel bit streams, u8bit0, u8bit1, u8bit2, u8bit3, u8bit4, u8bit5, u8bit6 and u8bit7, where each bit stream corresponds to a single bit position within successive code units of u8data. Thus, u8bit3(i) represents bit 3 of u8data(i). In the example of FIG. 1, the rows labeled u8bit0(i) through u8bit7(i) show the bit streams that correspond to u8data(i). The further rows of FIG. 1 show other parallel property streams as will be described subsequently.

Usually, UTF-8 data streams of interest will be much longer. Streams will typically be processed in blocks. As an example, in accordance with one embodiment of the present invention, a block size of 128 bytes is used for processing 128 code units at a time. The corresponding parallel bit streams in this case will each be processed in blocks of 128 bits (16 bytes).

The u8data data stream and the u8bit0 through u8bit7 parallel bit streams are property data streams that are all said to be u8-indexed. A property data stream is u8-indexed if it consists of a sequence of data values in one-to-one correspondence with code units of an original UTF-8 data stream.

In accordance with one or more embodiments of the present invention, other u8-indexed property data streams may be defined as logical combinations of existing u8-indexed property data streams. For example, let u8prefix be a u8-indexed bit stream identifying those UTF-8 code units whose value is in a range hexadecimal C0 through hexadecimal FF, i.e., a range of values reserved for UTF-8 prefix bytes. This property data stream is a bit stream that is defined by (or fabricated or created in accordance with) the following equation.

$$u8\text{prefix}(i) = u8\text{bit0}(i) \hat{} u8\text{bit1}(i) \quad (1.1)$$

In FIG. 1, the row labeled u8prefix(i) shows this stream for the example text.

Similarly, let u8prefix2 be a u8-indexed bit stream identifying prefix bytes in a more narrow range hexadecimal C0 through hexadecimal DF, i.e., u8prefix2 is a bit stream that identifies prefix bytes which indicate initial bytes of two-byte UTF-8 sequences. This property data stream is a bit stream that is defined by (or fabricated or created in accordance with) the following equation.

$$u8\text{prefix2}(i) = u8\text{prefix}(i) \hat{} \bar{u8\text{bit2}(i)} \quad (1.2)$$

Again, FIG. 1 illustrates this computation for the example text.

These initial examples may also serve to illustrate efficiency advantages that may be gained through use of parallel data streams in general, and parallel bit streams in particular, in accordance with one or more embodiments of the present invention. In accordance with one or more such embodiments, registers are utilized that permit logical operations on a number of data elements in parallel. Such embodiments may be referred to as simultaneous-instruction, multiple-data ("SIMD") embodiments. For example, the XMM registers of Pentium-compatible processor architectures and the Altivec registers of Power PC processor architectures each provide for logical operations on 128 bits in parallel. Thus, for example and without limitation, in accordance with one or more embodiments of the present invention, a single register may be loaded with 128 consecutive bits from the u8bit0 bit stream, while a second register may be loaded with a corresponding 128 bits from the u8bit1 bit stream. A logical "and" operation applied to these two registers determines, in a single operation, a set of all code units within a block of 128 that represent prefix bytes (see eqn. 1.1). In addition, in one more step, this value may be combined using an "and complement" operation with an appropriate 128 bits loaded from the u8bit2 bit stream (see eqn. 1.2). By way of contrast, in accordance with prior art techniques, a byte-at-a-time loop for determining and classifying prefix bytes would require several hundred operations to process 128 code units.

Although SIMD facilities of modern processor architectures may provide the greatest advantage in parallel data stream manipulation, alternative embodiments of the present invention may achieve useful parallelism using standard processor instructions. For example, in accordance with one or more such alternative embodiments, parallelism involving 32 code units at a time may be achieved by using standard logical instructions of 32-bit processors.

In accordance with one or more embodiments of the present invention, one may move beyond strict logical combinations of aligned data stream values, to define derived data streams in terms of properties of neighboring code units. For example, let u8scope22(i) (a property data stream) represent a property that the code unit i is expected to be the second byte of a two-byte UTF-8 sequence. This property is true whenever the immediately preceding byte is a prefix byte in the hexadecimal C0 through DF range. See FIG. 1 for the running example. The following pair of equations may be used to define the property.

$$u8\text{scope22}(i) = u8\text{prefix2}(i-1), \text{ if } i \geq 1 \quad (1.3)$$

$$u8\text{scope22}(0) = 0 \quad (1.4)$$

Computation of properties such as these involves data shifting operations. Proper implementation requires attention to issues such as block and buffer boundaries, and details thereof are described in a subsequent section.

A further convention simplifies the definition of data shifting properties in many cases. The convention is that for any negative index i, u8data(i) is defined to be the null byte (0). By extension, the convention also applies to bit streams u8bit0 through u8bit7: u8bitn(i)=0, for all i<0. In the example of u8scope22, this convention allows a simplification by dropping special case handling that avoids u8prefix2(−1) in the case i=0. That is, the definition simplifies to a single unconditional equation.

$$u8\text{scope22}(i) = u8\text{prefix2}(i-1) \quad (1.5)$$

1.2 Property Streams in General

As illustrated by the examples above, many derived properties of interest, in accordance with one or more embodiments of the present invention, are logical or Boolean properties that may be represented using a single bit per code unit. This is advantageous as it provides for maximum parallelism in processing code units within fixed registers. However, in some cases, in accordance with one or more embodiments of the present invention, there are non-Boolean properties that are nevertheless u8-indexed. For example, the rows labeled u8hi4(i) and u8lo4(i) in FIG. 1 show, in hexadecimal notation, two parallel property streams derived from u8data(i), representing respectively the high 4 bits and the low 4 bits of each code unit. Similarly, the row labeled cpbyte(i) shows another u8-indexed property consisting of 8-bit code point values; this property will be described in a later section.

The examples above of u8-indexed property data streams illustrate a general concept of property streams that track data in one-to-one correspondence with code units of a UTF-8 byte stream in accordance with one or more embodiments of the present invention.

In addition, one or more embodiments of the present invention deal with data streams represented using UTF-16 and UTF-32. A property data stream is said to be u16-indexed if it is indexed in one-to-one correspondence with code units comprising a UTF-16 representation of a Unicode text. Similarly a property data stream is said to be u32-indexed if it is indexed in one-to-one correspondence with code units comprising a UTF-32 representation of a Unicode text. However, UTF-32 code units also have a one-to-one correspondence with Unicode code points, so a u32-indexed stream may also be said to be code point-indexed or character-indexed.

2. Idealized SIMD Architecture

This section introduces an idealized SIMD instruction set architecture useful for simplifying the description and implementation of operations on parallel data streams fabricated in accordance with one or more embodiments of the present invention. The architecture models basic capabilities of existing SIMD processors, including SIMD operations for integer arithmetic, bitwise logic and bit shifting, as well as field packing and merging. The architecture also extends these capabilities by providing support for inductive doubling, a property useful in some embodiments of algorithms in parallel bit stream processing in accordance with one or more embodiments of the present invention. As used herein, inductive doubling refers to algorithmic processes that involve repeated doublings of data element widths or other data attributes. The inductive doubling extension considerably simplifies the initial description of many algorithms on parallel data streams so that techniques for handling implementation details on existing SIMD architectures can then be addressed as secondary issues.

The idealized architecture is based on SIMD operations over registers of total size $N=2^K$ bits, for some integer K. For example, for K=6, registers are 64 bits in size, as with Pentium MMX and Sun VIS facilities, while for K=7, registers are 128 bits in size, as with Pentium SSE (The term "SSE" will generally be used herein to represent a family of technologies including but not limited to Pentium SSE, SSE2, SSE3 and AMD 3D Now!) and Power PC Altivec facilities. Bits are numbered 0 to N−1 from left to right (big-endian convention). As described herein, the idealized architecture generally provides instructions in three-address form in which an N-bit destination register receives the value of applying an SIMD binary operation to two N-bit source registers. An alternative arrangement using two-address instructions is straightforward; using one register as both source and destination.

In accordance with one or more embodiments of the present invention, inductive doubling provides for partitioning SIMD registers into N/n fields of width $n=2^k$ bits, for any k: $0 \leq k \leq K$. For example, for K=6, the 64 bit SIMD registers may be treated as 64 1-bit fields, 32 2-bit fields, 16 4-bit fields, 8 8-bit fields, 4 16-bit fields, 2 32-bit fields or 1 64-bit field. When a register r is partitioned into n-bit fields, the fields are indexed $r_n[0]$ through $r_n[N/n-1]$. Field $r_n[i]$ consists of bits i×n through (i+1)×n−1 of register r.

For each field width under this partitioning scheme, the idealized architecture provides unsigned integer addition, subtraction and multiplication as SIMD operations. Field width is specified as an operation modifier, applying to the result register as well as both source registers. Modular arithmetic confines results to the field widths as specified by the following equations.

$$r=\text{simd\_add}/n(a,b) \text{ implies } r_n[i]=(a_n[i]+b_n[i])\bmod 2^n \quad (2.1)$$

$$r=\text{simd\_sub}/n(a,b) \text{ implies } r_n[i]=(a_n[i]-b_n[i]+2^n)\bmod 2^n \quad (2.2)$$

$$r=\text{simd\_mult}/n(a,b) \text{ implies } r_n[i]=(a_n[i] \times b_n[i])\bmod 2^n \quad (2.3)$$

Although existing SIMD architectures tend to provide more elaborate arithmetic models, including such options as signed arithmetic, saturating arithmetic, and double-sized result fields; the simple forms shown above suffice for parallel data stream operations described subsequently.

The idealized architecture also supports inductive doubling through half-operand modifiers that may be applied to SIMD register operands. These modifiers specify that only the high (/h) or low (/l) n/2 bits of each n-bit field are used in the operation. That is, $r/h_n[i]=r_n[i]>>n/2$ where >> is the shift right operator) and $r/l_n[i]=r_n[i]\bmod 2^{n/2}$. For example, if 8-bit fields of register s contain packed pairs of 4-bit values, these values may be added together to produce a register t of 8-bit sums by means of the operation t=simd_add/8(s/h, s/l).

Together, the provision of integer operations at all field widths and the half-operand modifiers conveniently simplify parallel data stream algorithms. Existing SIMD architectures typically provide arithmetic operations on some, but not all, field widths, and half-operand selection only in special cases. Adapting algorithms to these architectures generally requires additional shifting and/or masking operations in the implementations.

Bitwise logical operations under the idealized instruction set architecture are straightforward and model capabilities of existing SIMD architectures closely. These operations may be considered to be implicitly associated with 1-bit field widths, although field width specifiers are not used. The following equations apply.

$$r=\text{simd\_and}(a,b) \text{ implies } r_1[i]=a_1[i] \wedge b_1[i] \quad (2.4)$$

$$r=\text{simd\_andc}(a,b) \text{ implies } r_1[i]=a_1[i] \wedge \neg b_1[i] \quad (2.5)$$

$$r=\text{simd\_or}(a,b) \text{ implies } r_1[i]=a_1[i] \vee b_1[i] \quad (2.6)$$

$$r=\text{simd\_nor}(a,b) \text{ implies } r_1[i]=\neg(a_1[i] \vee b_1[i]) \quad (2.7)$$

$$r=\text{simd\_xor}(a,b) \text{ implies } r_1[i]=a_1[i] \oplus b_1[i] \quad (2.8)$$

Note also that integer arithmetic at a field width of 1 may be specified, but reduces to the corresponding bitwise logical operation. That is, simd_add/1 and simd_sub/1 reduce to simd_xor while simd_mult/1 reduces to simd_and.

SIMD shift operations under the idealized architecture include shift left logical (simd_shll), shift right logical (simd_shrl), shift right arithmetic (simd_shra), and rotate left (simd_rotl) at each field width $n=2^k$. The n-bit data fields within a first operand register are each independently shifted by amounts specified by corresponding n-bit shift fields in a second operand register. However, only the k low-order bits of the shift fields are used to specify the shift amounts. For example, r=simd_shll/n(a, b) computes each field by $r_n[i]=a_n[i]<<(b_n[i]\bmod 2^k)$ These operations are equivalent to the corresponding Altivec operations on the Power PC for 8, 16 or 32 bit fields, but are also available for 2, 4, 64, or 128 bit fields in the idealized architecture.

The pack and merge operations common to SIMD architectures are generalized to all field widths under the idealized architecture. These may be viewed as operations which respectively halve or double the widths of data values and hence are core features in support of inductive doubling.

The simd_pack/n operation packs the n-bit fields of two N-bit input registers into n/2-bit fields in a single N-bit result register. The first N/2 bits of the result are formed by converting each of the n-bit fields of the first input operand to n/2 bits, while the second N/2 bits of the result are formed by correspondingly converting the n-bit fields of the second input operand. Conversion by means of signed or unsigned saturation or by truncation are feasible and satisfactory for the purpose of this invention. The following equations define the field values for r=simd_pack/n(a, b).

$$r_{n/2}[i]=\text{convert}(a_n[i],n/2), i<N/n \qquad (2.9)$$

$$r_{n/2}[i]=\text{convert}(b_n[i-N/n], n/2), i \geq N/n \qquad (2.10)$$

The simd_mergeh/n and simd_mergel/n operations select alternating n-bit fields from the two input operands to form 2n-bit fields in the result. The simd_mergeh operation takes n-bit fields from the high N/2 bits of each of the input operands, while the simd_mergel operation takes alternating n-bit fields from the low N/2 bits of each operand. The r=mergeh/n(a, b) operation is defined by the following equation.

$$r_{2n}[i]=a_n[i] \times 2^n + b_n[i] \qquad (2.11)$$

Similarly, the r=mergel/n(a, b) operation is defined by the following equation.

$$r_{2n}[i]=a_n[i+N/2n] \times 2^n + b_n[i+N/2n] \qquad (2.12)$$

3. One or More Embodiments of Parallel Data Stream Processing

Section 3. describes data stream processing methods that are fabricated in accordance one or more embodiments of the present invention. In particular, Section 3.1 describes how data streams may be processed using fixed size blocks and buffers. Section 3.2 describes a transposition operation that converts a byte stream (for example, a UTF-8 code unit stream) into a corresponding set of eight parallel bit streams. Sections 3.3 through 3.6 describe utility operations for extracting information from bit streams, including, respectively, bit counting, error bit detection, bit position determination, and run position determination. Section 3.7 describes the use of bit streams as deletion masks to provide for editing of parallel data streams, including bit streams in particular. Finally, Section 3.8 returns to the topic of transposition, and describes an inverse operation of parallel bit stream to serial byte transposition.

3.1 Blocks, Buffers, and Boundaries in Data Stream Processing

As illustrated in Section 2., parallel data streams constitute sequences of arbitrary length. As such, one or more embodiments of the present invention comprise processing such sequences using physical resources, with particular constraints on the number of sequence elements that can be stored and manipulated at one time.

Some embodiments of the present invention that utilize XMM registers of Pentium or compatible processors or Altivec registers of Power PC processors manipulate code units in blocks of 128 at a time and group blocks into buffers of 2048 code units (16 blocks per buffer). For such embodiments, a bit stream will use 128 bits (16 bytes) per block and 2048 bits (256 bytes) per buffer, while a byte stream will require 128 bytes per block and 2048 bytes per buffer.

In organizing processing of data streams in this manner, one must ensure correct processing of data streams in dealing with file, buffer and block boundaries. A general problem is that values of a data stream are often specified in terms of values of other data streams in different but nearby positions. For example, consider the determination of u8scope22(i) in terms of u8prefix2(i−1). In essence, u8scope22 is a shifted version of u8prefix2. However, because of end effects, a single shift instruction will not suffice to correctly implement the shift for all positions within the data stream. In general, there are four boundary conditions that must be considered.

(1) i mod 128=0; a block-boundary crossing condition.
(2) i mod 2048=0; a buffer-boundary crossing condition.
(3) i=0; a beginning of file condition.
(4) i=N; an end of file condition.

The block-boundary crossing and the buffer-boundary crossing conditions can be handled by preserving and combining information between consecutive iterations of a loop. Continuing with the example of u8scope22, let oldprefix2 and thisprefix2, respectively, be values of the u8prefix2 bit stream for the previous block (i.e., the previous time through the loop) and the current block respectively. Then, the value of u8scope22 may be computed by shifting the value of oldprefix2 left by 127 bits, shifting the value of thisprefix2 right by 1 bit, and forming the disjunction (logical 'or') of the results. In an iteration that processes each block within a buffer, the value of thisprefix2 at the end of each iteration can be used to establish the value of oldprefix2 for the next iteration. To begin processing the buffer, the value of oldprefix2 must be initialized to the value determined during processing of the last block of the previous buffer. Assuming this has been arranged, FIG. 2 shows a loop fragment implementing the calculation using the C-language interface for Altivec programming on the Power PC processor.

There are various ways to ensure that a value calculated for processing the last block of one buffer is made available to initialize processing of the first block of the next buffer. In accordance with one or more embodiments of the present invention, a ring of buffers is maintained as a general structure to support both lookbehind and lookahead operations. A ring of three buffers allows for previous, current and next buffers to be defined at all times. In the example, then, to initialize the value of oldprefix2 for processing the current buffer, it is a straightforward matter to retrieve or recompute the u8prefix2 value for the last block of the previous buffer. The concept of a buffer ring is well known in the prior art.

As described in the Section 1.1, a convenient extension to the concept of data streams that allows beginning of file conditions to be handled easily is to consider that the u8data (i) and u8bit0(i) through u8bit7(i) have null (0) values for all negative positions i. This extension is easily implemented by specifying a null buffer (a buffer of all 0 values) as the initial value of the "previous" buffer when a file is opened. In this way, the shift operation that implements u8scope22(i)= u8prefix2(i−1) will correctly handle the beginning of file case by shifting in a 0 from u8prefix2(−1).

The final boundary condition that must be considered is the end-of-file case. As defined previously, the file consists of characters at positions 0 through N−1. However, the equation defining u8scope22 specifies a value at a position one past the end of file (i.e., at position N) in terms of the u8prefix2(N−1). It is thus possible that u8scope22(N)=1 in the event that that last code unit of the file is the prefix of a 2-byte sequence. Depending on the application, an embodiment of a system that is fabricated in accordance with the present invention may need to permit bit streams to extend beyond the end of file in this way. For example, in a task of UTF-8 validation, a value of u8scope22(N)=1 indicates an ill-formed UTF-8 code sequence at the end-of-file: a 2-byte sequence was initiated, but the end-of-file occurred before the expected suffix byte.

In some applications, it may be possible to simplify processing of block and/or buffer boundaries to avoid maintaining information between iterations. If the application involves natural and frequent break points across which information need not flow, then it may be worthwhile to employ a dynamic block shortening strategy that reduces the length of each block by the minimum value to reach such a break point. For example, in UTF-8 validation, decoding and/or transcoding, the beginning and end of each complete code unit sequence represents a natural break point. Block shortening involves a tradeoff: avoiding the cost of maintaining information flow across blocks, at the expense of a slight reduction in the number of of elements processed per block and possibly the cost of dealing with data alignment issues.

3.1.1 General Shifts

Section 3.1 illustrated the case of single-bit shifting in bit stream generation. The single-bit shift is the most common operation in that it reflects a constraint or property relating to adjacent character positions. However, the same technique applies to multiple bit shifts. For example, consider a bit stream u8scope33(a property data stream), denoting the 3rd byte position within a 3-byte sequence. UTF-8 prefix bytes between E0 and EF are reserved for 3-byte sequences; the u8scope33 stream has the value 1 whenever the u8prefix3 has the value 1 two positions previously.

$$u8prefix3(i) = u8prefix(i) \char`\^ u8bit2(i) \char`\^ \neg u8bit3(i) \quad (3.1)$$

$$u8scope33(i) = u8prefix3(i-2) \quad (3.2)$$

Calculation of u8scope33 thus requires a double-bit shift. Using the same strategy as that for single-bit shifts, the value of u8scope33 may be computed by shifting the value of oldprefix3 left by 126 bits, shifting the value of thisprefix3 right by 2 bits, and forming the disjunction (logical 'or') of the results. The u8scope33(0) and u8scope33(1) cases are handled by shifting in 0 values from u8prefix3(−2) and u8prefix3(−1), respectively, following the above-described convention that input data is null for all negative positions. This is handled automatically by initialization of the "previous" buffer to all zeroes at the beginning of the file.

The general pattern illustrated by these techniques applies for longer length shifts as well, i.e., up to the block size (128-bit shifts in the illustrated embodiment). Applications are generally limited to short-range shifts well below this limit. If necessary, however, shifts in excess of the block size can be accommodated by variations on this scheme that maintain access to more than one prior block (not just the last block).

3.1.2 End-of-Stream Padding

A UTF-8 data stream may or may not end on a natural buffer or block boundary. In order to simplify handling of the last block in a stream, however, one or more embodiments of the present invention pad the final block with null bytes beyond the logical end of file up to a full block (128-byte) boundary. In essence, this entails maintaining a full-block invariant; i.e., data streams may always be processed as if they consist of a whole number of blocks.

A full-block invariant simplifies implementation of methods designed to process one or more blocks of data. These methods include core methods that are fabricated in accordance with one or more embodiments of the present invention that are described in sections below. In essence, the simplification eliminates a need for an intra-block, end-of-stream test that might otherwise be required when processing each block, as well as any special code for handling a partial block. Advantageously, embodiments of methods written to the full-block invariant are easier to read and write, and hence, reduce the potential for coding errors. Furthermore, these simplifications avoid any performance penalty that may arise from intra-block bounds checking.

3.1.3 Block Processing Circuitry

One or more embodiments of the present invention implement one or more character stream processing functions as logic circuits operating on blocks of parallel bit stream data. Given a block size of N, bit stream equations involving logic and lookbehind shift operations may be implemented using logic circuitry as follows. For each basis stream used by the equations, an N-bit register is provided to hold one block of data from that stream at a time. For each distinct bit stream that is accessed in lookbehind shifted form within the set of equations, an s-bit register is provided to hold values of that term from the previous block, where s is the maximum size of the shift involving that term within any of the equations. For each logical operation ($\char`\^$, $\vee$, $\neg$, $\oplus$), involving a distinct set of operands within the set of equations, an array of N logic gates (and, or, not, xor) is provided to compute the values of the one block segment of the derived bit stream corresponding to the given logical operation. Inputs to the gate arrays are wired from the outputs of registers holding basis streams, outputs of s-bit registers holding values stored for the previous block, or outputs from other gate arrays representing results of intermediate computations. Outputs that are needed in shifted form for processing the next block of input data are wired to the inputs of the corresponding s-bit register, for loading into that register in conjunction with a next-block signal.

In some applications, it may be possible to simplify processing of block boundaries to avoid maintaining bit stream values from previous blocks in s-bit registers. If the application involves natural and frequent break points across which information need not flow, then it may be worthwhile to employ a dynamic block shortening strategy that reduces the length of each block by the minimum value to reach such a break point. For example, in UTF-8 validation, decoding and/or transcoding, the beginning and end of each complete code unit sequence represents a natural break point.

3.2 Serial Byte to Parallel Bit Stream Transposition

In accordance with one or more embodiments of the present invention, transposition of an input byte stream into a corresponding representation as eight parallel bit streams is performed in accordance with a serial-byte-to-parallel-bit-stream transposition method which may be carried out, for example and without limitation, in a transposition unit. In particular, in accordance with one or more embodiments of the present invention, three binary division transformations are utilized to achieve the overall transposition where each transformation divides up an input stream into two half-length output streams. Three stages of such binary division transformations generate eight bit streams, each of one-eighth the length of the original input stream.

Using the idealized instruction set architecture, each of these three transformations can be implemented using simd_pack operations. In accordance with an embodiment of the present invention, one method entails using: (a) simd_pack/8 operations in a stage one transformation to divide the input byte stream into two streams of nybbles; (b) simd_pack/4 operations in a stage two transformation to divide the nybble streams into four streams of bit pairs; and (c) simd_pack/2 operations in a stage three transformation to produce the eight bit streams from the streams of bit pairs. FIG. 3 details this process, showing the transposition of eight consecutive registers of serial byte data (u8data0, u8data1, through u8data7) into eight parallel registers of bit stream data (u8bit0, u8bit1, through u8bit7). Note the use of the half-operand modifiers to select the high n/2 bits or low n/2 bits in conjunction with each simd_pack/n operation.

Alternative embodiments may use different strategies for dividing up bits within each stage, while still retaining the structure of a three-stage process using binary division transformations. For example, simd_pack/2 operations could be used in all three stages: (a) separating even bits (bit 0, 2, 4 and 6 of input bytes) from odd bits (bits 1, 3, 5, 7) in a stage one transformation; (b) further separating bits 0 and 4 from bits 2 and 6 and bits 1 and 5 from bits 3 and 7 in a stage two transformation; and (c) then dividing these into the individual bit streams in a stage three transformation.

While the three-stage structure of the transposition process carries over to embodiments using other SIMD architectures, alternative binary division strategies and additional implementation detail at each stage of transformation may be required, depending on the instruction set capabilities. For example, the finest-grained packing operation available with a number of existing architectures is the equivalent of simd_pack/16, packing doublebytes into bytes. Using packing operations at this level, the binary division transformations generally require additional masking and shifting operations. The number of additional operations required depends on choice of binary division strategy.

Using doublebyte-to-byte packing, a strategy of pairing up elements from consecutive bytes can constrain the overhead of masking and shifting operations to one shift and mask-select operation per output register per stage. In a first stage transformation, corresponding bits from two consecutive bytes are paired up, separating even bits from odd bits. That is, given consecutive bytes a and b in the input, the bits are divided into separate output streams having $a_0b_0a_2b_2a_4b_4a_6b_6$ and $a_1b_1a_3b_3a_5b_5a_7b_7$ byte patterns. In a second stage transformation, corresponding pairs from consecutive bytes are brought together to form runs of 4 bits. For example, given consecutive even bytes in $a_0b_0a_2b_2a_4b_4a_6b_6$ and $c_0d_0c_2d_2c_4d_4c_6d_6$ patterns, output bytes in the patterns $a_0b_0c_0d_0a_4b_4c_4d_4$ and $a_2b_2c_2d_2a_6b_6c_6d_6$ are formed. Then, a third stage transformation brings together runs of four to result in continuous bit streams. FIG. 4 illustrates the implementation of this process with an Altivec code fragment implementing the first stage transformation in accordance with an embodiment of the present invention, for example.

Alternative embodiments of serial to parallel byte transformation may use other techniques depending on instruction set architecture. For example, the pmovmskb operation on SSE-family processors allows the direct extraction of bit stream segments corresponding to 16 input bytes at a time.

In accordance with one or more embodiments of the present invention, a serial byte to parallel bit stream transposition is implemented as a routine that takes a data stream as a contiguous array of one or more blocks of UTF-8 byte data and writes bit stream data to eight preallocated output arrays. For example, a full buffer of 2048 bytes may be processed iteratively using 16 executions of a loop that processes the input array 128 bytes at a time. Each loop iteration generates 128 bits (16 bytes) per bit stream. Using the Altivec processor instruction set, for example, 72 logic, shift and pack instructions suffice to transform a block of 128 bytes in straight line code without branching. Organized in this way, the transposition code makes effective use of processor pipelining capabilities.

With an input byte stream meeting the full-block invariant, generated bit streams will also meet this invariant, considered in blocks of 128 bits (16 bytes).

3.3 Bit Detection Method and/or Unit

In accordance with one or more embodiments of the present invention, a bit detection method which may be carried out, for example and without limitation, in a bit detection unit, determines whether a full or partial bit buffer contains any occurrence of a 1 bit. In accordance one or more embodiments of the present invention, the unit is optimized so that absence of a bit may be verified in the shortest time. Successive 128-bit blocks are combined with a logical or operation until all blocks have been processed. A sum across this result is computed and tested for equality with zero. A nonzero value signals the occurrence of a 1 bit within the buffer. FIG. 5 shows an Altivec processor implementation in accordance with an embodiment of the present invention.

In accordance with one or more embodiments of the present invention, applications of bit detection include, for example and without limitation, error checking applications and optimization applications. In error checking applications, a bit vector may be computed to signal code unit positions at which particular types of error occur. Bit detection may be used to quickly verify the absence of error, or invoke error-handling code otherwise. In optimization applications, bit detection may be used to avoid special case handling of rarely occurring conditions. For example, 4-byte sequences occur quite rarely in UTF-8. When processing a buffer full of UTF-8 data, special case code dealing with 4-byte sequences may be skipped if no such sequence occurs within the buffer.

3.4 Bit Counting Method and/or Unit

In accordance with one or more embodiments of the present invention, a bit counting method, which may be carried out, for example and without limitation, in a bit counting unit, counts the number of 1 bits in a bit stream. Bit counting has a number of applications. One example is determining the number of lines in a file. By forming a bit stream that identifies end-of-line code units, this is transformed to a bit counting problem. Another example is determining the number of characters represented by a sequence of UTF-8 code units. By forming a bit stream identifying all non-suffix bytes, this also is transformed to a bit counting problem.

Counting bits within a $N=2^K$ bit register may be carried by K simd_add operations of the idealized instruction set architecture using an inductive doubling strategy. To count bits in a register x, the operation r=simd_add/2(x/l, x/h) is first used to produce N/2 fields each holding a 2-bit sum. The operation r=simd_add/4(r/l, r/h) is then applied to produce N/4 4-bit sums. The process continues with r=simd_add/8(r/l, r/h) to produce 8-bit sums and so on until a single N-bit sum remains.

A method that is fabricated in accordance with one or more embodiments of the present invention implements bit counting on a bit buffer meeting the full-block invariant, i.e., consisting of an array of one or more full blocks of 128 bits. In practice, bit counting is generally applied to a full buffer of 16 blocks at a time, providing for efficient use of the instruction pipeline. An integer result is returned.

One or more embodiments of the present invention implement a bit counting module as a dedicated logic circuit using adders or half-adders in accordance with techniques well known in the prior art.

3.5 Bit Position Arrays

Given a bit stream, it is frequently useful to generate an array of positions at which one bits are found, particularly in the case of relatively sparse bit streams. Such a position array allows iteration over all character positions matching a condition defined by the bit stream. Positions not matching the condition are simply skipped; this can substantially improve performance compared to byte-at-a-time processing. Conditional iterations formed in this way also have an advantage for pipelined architectures; i.e., branching logic that implements condition testing is eliminated from the loop body. This avoids performance penalties associated with branch misprediction within loops.

Bit position arrays can be constructed using bit scan instructions, such as bsf on Pentium processor architectures and cntlz on Power PC processor architectures. FIG. 6 shows an inline assembly implementation (GCC conventions) in accordance with one embodiment of the present invention suitable for a 32-bit Pentium architecture processor and compatible processors.

A method fabricated in accordance with one or more embodiments of the present invention determines bit positions given an input buffer meeting a full-block invariant, i.e., consisting of an array of one or more full blocks of 128 bits. In practice, full buffers of 16 blocks at a time are typically provided as input. The output array to receive bit positions must be preallocated to the maximum size anticipated; 2048 positions for a full buffer. An integer result is returned indicating the number of one bits found in the input buffer.

3.6 Run Position Arrays

An alternative to the use of bit position arrays for controlling conditional iterations is to use arrays of run positions, i.e., positions marking the beginning and ending of runs of consecutive 1 bits. This may reduce the number of iterations required considerably. Run arrays also create opportunities for parallelism by identifying consecutive runs of data elements that can all be processed in the same way. As with bit position arrays, iterations controlled by run position arrays avoid performance penalties of branch misprediction associated with condition testing within loops.

The methods described above for bit position determination can readily be extended for run determination by one of ordinary skill in the art routinely and without undue experimentation. The principal change required is to invert a bit stream being scanned once the start position of a run has been determined. This will allow the end of the run to be identified with the next scanning step, that is, as the first position in the inverted input that has a bit value of 1. Once the end of the run is found, the remaining bit stream is inverted to its original value to permit determination of the beginning of the next run.

A method fabricated in accordance with one or more embodiments of the present invention determines run positions given an input buffer meeting the full-block invariant, i.e., consisting of an array of one or more full blocks of 128 bits. In practice, full buffers of 16 blocks at a time are provided as input. The output array to receive run positions must be preallocated to the maximum size anticipated; 2048 positions maximum (1024 start positions and 1024 end positions) for a full buffer. An integer result is returned indicating the number of runs found in the input buffer.

3.7 Parallel Deletion Method and/or Unit

In accordance with one or more embodiments of the present invention, a parallel deletion method, which may be carried out, for example and without limitation, in a parallel deletion unit, performs deletion of one or more code units in one or more parallel data streams in accordance with a deletion mask. A deletion mask is defined as a bit stream consisting of 1s at positions identifying code units to be deleted and 0s at positions identifying code units to be retained. The data streams may be parallel bit streams such as a set of 8 parallel bit streams for UTF-8 code units, or byte streams such as a set of 2 parallel byte streams for UTF-16 code units or other forms of character-indexed data streams.

For example, consider an 8-bit deletion mask 10100010 and two corresponding 8-element parallel data streams abcdefgh and ABCDEFGH. Parallel deletion of elements from both data streams in accordance with the mask yields two five element streams, i.e., bdefh and BDEFH.

Deletion within fixed size fields or registers may produce results that are either left justified or right-justified. For example, a five-element stream bdefh within an eight-element register may be represented as either bdefhxxx or xxxbdefh, with don't care positions marked 'x'. Concatenating an adjacent right-justified result with a left-justified result produces an important intermediate form known as a central deletion result. For example, xxbd and efhx may be respective right-justified and left-justified results from the application of the 4-bit deletion masks 1010 and 0010 to the two consecutive 4-element stream segments abcd and efgh. Concatenation of xxbd and efhx produces the central result xxbdefhx, which may easily be converted to a either a left or a right justified 8-element result by an appropriate shift or rotate operation.

In accordance with one or more embodiments of the present invention, bit deletion is achieved by the method of central result induction. The process is initiated by considering pairs of adjacent bits to be 2-bit central deletion results. Inductive steps subsequently combine adjacent pairs of 2-bit central results to achieve 4-bit central results, combine pairs of 4-bit central results to achieve 8-bit central results, and so on. In general, given two adjacent n-bit central deletion results, the inductive step produces a 2n-bit central deletion result by right-justifying the left n-bit result, left-justifying the right n-bit result and concatenating them together.

Using the idealized instruction set architecture, central result induction may be implemented using simd_rotl instructions at each induction level. Working with 128 bit registers, for example, the process begins by considering the bit stream data to be partitioned into 64 adjacent 2-bit central deletion results. A simd_rotl/2 instruction applies the necessary rotations to produce 32 4-bit central results. A simd_rotl/4 instruction then combines adjacent 4-bit results to produce 16 8-bit central results. The process continues with simd_rotl/8, simd_rotl/16, simd_rotl/32 and simd_rotl/64 instructions to produce an 128-bit central deletion result in six steps.

The techniques of section 3.1 are used to combine results from consecutive 128-bit blocks to perform deletion on longer length streams, such as buffers of 2048 bits used in accordance with one or more embodiments of the present invention.

The rotation factors used by each of the simd_rotl instructions must be established so that for every pair of n-bit results to be combined into a 2n-bit result, the left n-bit result is right-justified and the right n-bit result is left justified. Left justification of the right n-bit result requires that the result be shifted by the number of deleted elements on its left-side, that is the deletion count of the left n/2 bits of this n-bit result. For example, consider the 4-bit central deletion result xbxx corresponding to a deletion mask 1011 applied to the 4-bit segment abcd. Left justification to produce bxxx requires a left shift of 1, the deletion count of the first 2 bits of the mask. This left shift factor is used directly for the left rotate operation of simd_rotl, observing that any bits that rotate around to the right end are located in the don't care portion of the required result.

Right justification of the left result similarly requires a right shift by the deletion count of the right n/2 bits of the left n-bit result. To implement a right-shift using the left rotate operation of simd_rotl, a left rotate factor of n minus the deletion count is calculated. For example, consider the 4-bit central deletion result xxcx corresponding to a deletion mask 1101 applied to the 4-bit segment abcd. Right justification requires a right shift of 1. This may be implemented by a left rotate of 4−1=3, yielding xxxc, as required.

The rotation factors required for each simd_rotl operation are calculated in an inductive process as follows. Because a 1 bit in a deletion mask denotes a position to be deleted, each 0 or 1 in the deletion mask may be considered as the deletion count of the corresponding 1-bit field. Given the deletion mask in a register d1, the 64 deletion counts for 2-bit fields may be calculated using d2=simd_add/2(d1/h, d1/l). That is, each 2-bit field receives the sum of the high 1-bit count and the low 1-bit count. The 32 deletion counts for 4-bit fields are similarly produced by d4=simd_add/4(d2/h, d2/l) and so on. Deletion counts of high n/2 bit fields are used directly as rotation factors of right n-bit fields. Rotation factors of left n-bit fields are calculated using a simd_sub/n operation. The set of rotation factors used for each simd_rotl operation is then determined by selecting alternate values from those calculated for left n-bit fields and right n-bit fields.

The process of computing rotation factors is required only once for each set of parallel bit streams to be processed. The parallel deletion unit therefore provides a routine compute_deletion_info that calculates this information based on a deletion mask. The parallel deletion unit provides the routine delete_using_info to apply this information repeatedly on as many parallel bit streams as desired.

In accordance with one or more embodiments of the present invention, routines perform deletion within streams of bytes or doublebytes based on deletion masks. Deletion information is calculated based on bit masks considering, for example, 128 elements at a time. The computed information may then be used to perform deletion by byte rotation considered 16 bytes at a time within 128-bit registers or doublebyte rotation considered 8 doublebytes at a time within 128-bit registers.

Alternative embodiments may use an additive shift process in performing deletion by left-result induction. Similar to central result induction, the goal is to compute 2n-bit left deletion results by combination of adjacent pairs of n-bit left results. In general, this may be achieved by computing a 2n-bit additive shift term, and then, applying that term to the 2n-bit value formed by the adjacent n-bit inputs. The shift term is computed by multiplying the right n-bit input by $2^k-1$ where k is the deletion count of the left n-bit input. In essence, this implements a 2n-bit conditional shift by k; i.e., the rightmost n-bits are shifted while the nondeleted bits of the left n-bit input remain in place. Left result induction requires that all deleted bits be masked to zero before the process starts.

The multiplicative factors $2^k-1$ are readily determined during the preprocessing phase based on an observation. The bit representation of the factor $2^k-1$ as an unsigned n-bit integer consists of n−k 0s followed by k 1s. However, this bit pattern is precisely that of the updated deletion mask corresponding to the deletion result of the left n-bit input. Thus, by updating deletion masks as the deletion operation proceeds, the multiplicative factors are directly available.

A special case of left result induction is at step 1, determination of 2-bit left results. In this case, a single-bit multiplication is nominally required. However, single bit multiplication is equivalent to the logical and operation. The multiplication can hence be eliminated.

For subsequent steps, multiplications may still be effective. Although multiplications typically have significant latency, pipelined architectures can reduce the effective cost to a single instruction cycle. In such cases, and assuming the operation can be parallelized, the typical cost per induction step per bit stream is four operations: one copy, one mask, one multiplication and one shift.

Left result induction by additive shift may thus be used when an instruction set architecture provides simultaneous multiplication of a vector of elements by a vector of multipliers, but does not provide corresponding shift operations. For example, the SSE extensions of the Pentium architecture provide such operations yielding 16-bit, 32-bit or 64-bit results, but do not have corresponding operations to independently shift elements of those sizes by independent shift values.

In the event that an instruction set architecture does not provide simultaneous rotation of a vector elements by a vector of independent rotation counts, alternative embodiments may employ central result induction if the bit deletion operation is to be applied to multiple bit streams in parallel. In such a case, SIMD registers may be repacked so that parallel segments from several bit streams may be processed at once. When computing a 2n-bit central induction result, the ideal is that registers are repacked to use corresponding n-bit segments from several streams. In this case, all segments within the register are to be shifted by the same amount; i.e., there is no need for independent rotation of elements within the register.

An instruction set architecture may provide a capability for selecting arbitrary bits using an index vector. For example, the PowerPC provides such a facility through its vec_perm instruction as does the Sun VIS architecture through its vis_b-shuffle instruction. An alternative embodiment of deletion of bytes or doublebytes is to initially use one of the deletion algorithms on index vectors and then apply the index vector to select the required nondeleted elements. If selection is to be arranged to a maximum of 16 elements at a time, a packed index vector using 4-bit index values may be initially computed. Deletion steps on this packed representation may have a twofold advantage over deletion steps on bytes or a fourfold advantage over deletion steps on doublebytes.

One or more embodiments of the present invention implement parallel deletion using dedicated logic circuitry. A logic circuit implementing parallel deletion on bit stream segments of $N=2^K$ bits may be realized as a K-stage logic circuit. The inputs to the first stage consist of a deletion mask and the parallel bit stream (the operand stream) to which parallel deletion is to be applied. The first stage first computes 2-bit deletion counts (deletion count stream) for each consecutive 2-bit field in the deletion mask. The first-stage partitioned shift register is wired to apply these counts to the rotation of each 2-bit field within the operand stream in accord with the method of central result induction. The updated deletion count stream and operand stream are connected to the inputs of the second stage. The second stage similarly adds pairs of adjacent deletion counts in 2-bit fields to produce 4-bit deletion counts and applies these counts to its operand stream in accord with the next stage of central result induction. Subsequent stages are configured similarly. The final stage is wired to perform the simple rotation of the N-bit central result to produce the final N-bit left deletion result.

3.8 Parallel Bit Stream to Serial Byte Transposition

A parallel bit stream to serial byte transposition process inverts the transposition process described in subsection 3.2 above. Three binary merging transformations are utilized to achieve the overall transposition. Each binary merging transformation combines two input streams to produce one double-length output stream. Three stages of such binary merging transformations generate one output stream of eight times the length of the original input stream. A binary merging transformation fabricated in accordance with one or more embodiments of the present invention will take as input fixed-length sections of eight parallel bit streams, each of the same length and satisfying the full-block invariant. FIG. 7 shows an embodiment using the simd_mergeh and simd_mergel instructions of the idealized instruction set architecture. Typically, full buffers of 2048 bits each will be supplied as input, generating full buffer of 2048 bytes into the preallocated data area.

In accordance with one or more embodiments of the present invention, the complementary transpositions allow applications to switch between byte processing and parallel bit stream processing at will.

4. Unicode Processing Methods

This section describes methods fabricated in accordance with one or more embodiments of the present invention that address specific requirements of Unicode text processing. UTF-8, UTF-16 and UTF-32 are each supported, including methods for code unit classification, validation and decoding. Transcoding operations between the representations are also provided.

Methods described in this section are fabricated in accordance with one or more embodiments of the present invention and utilize methods described above. In each case, equations are used to define bit streams relevant to particular processing requirements. In general, implementation details related to these equations that are not shown may be carried out by one of ordinary skill in the art routinely and without undue experimentation as a straightforward application of methods presented herein.

4.1 UTF-8 Byte Classification

A UTF-8 byte classifier forms useful bit stream definitions to support validation, decoding and conversion.

UTF-8 is based on 8-bit code units or bytes. Bytes in a range of hexadecimal 0-7F stand for Unicode code points directly. In essence, these are single-byte code unit sequences. Bytes in a range of hexadecimal 80-FF stand for multi-byte code unit sequences consisting of a prefix byte in a range of C0-FF and one or more suffix bytes, each in a range of hexadecimal 80-BF. Two-byte sequences have prefix bytes in a range of hexadecimal C0-DF; three-byte sequences have prefix bytes in a range of hexadecimal E0-EF; and four-byte sequences have prefix bytes in a range of hexadecimal F0-FF. Within these ranges, some prefix values are illegal, namely, C0, C1, and F5 through FF.

Section 1.1 defined u8prefix and u8prefix2 bit streams (property streams) to represent, respectively, the set of all prefix bytes and the set of those prefix bytes identifying the first bytes of two-byte sequences. Bit streams representing other byte classifications may similarly be defined by equations, as follows.

$$u8\text{unibyte}(i) = \neg u8bit0(i). \tag{4.1}$$

$$u8\text{prefix}(i) = u8bit0(i) \wedge u8bit1(i) \tag{4.2}$$

$$u8\text{suffix}(i) = u8bit0(i) \wedge \neg u8bit1(i) \tag{4.3}$$

$$u8\text{prefix2}(i) = u8\text{prefix}(i) \wedge \neg u8bit2(i) \tag{4.4}$$

$$u8\text{prefix3or4}(i) = u8\text{prefix}(i) \wedge u8bit2(i) \tag{4.5}$$

$$u8\text{prefix3}(i) = u8\text{prefix3or4}(i) \wedge \neg u8bit3(i) \tag{4.6}$$

$$u8\text{prefix4}(i) = u8\text{prefix3or4}(i) \wedge u8bit3(i) \tag{4.7}$$

$$u8badpfx2(i) = \frac{u8prefix2(i) \wedge}{\neg (u8bit3(i) \vee u8bit4(i) \vee u8bit5(i) \vee u8bit6(i))} \tag{4.8}$$

$$u8badpfx4(i) = \frac{u8prefix4(i) \wedge}{(u8bit4(i) \vee u8bit5(i) \wedge (u8bit6(i) \vee u8bit7(i)))} \tag{4.9}$$

Corresponding to each occurrence of a UTF-8 prefix byte, particular expectations are established for a suffix byte at positions 2, 3 or 4 in a multi-byte sequence. Following the pattern of u8scope22 given previously, scope equations specifying the location of expected suffix bytes for 3 and 4 byte sequences are defined as follows.

$$u8\text{scope22}(i) = u8\text{prefix2}(i-1) \tag{4.10}$$

$$u8\text{scope32}(i) = u8\text{prefix3}(i-1) \tag{4.11}$$

$$u8\text{scope33}(i) = u8\text{prefix3}(i-2) \tag{4.12}$$

$$u8\text{scope42}(i) = u8\text{prefix4}(i-1) \tag{4.13}$$

$$u8\text{scope43}(i) = u8\text{prefix4}(i-2) \tag{4.14}$$

$$u8\text{scope44}(i) = u8\text{prefix4}(i-3) \tag{4.15}$$

One additional definition is useful to identify those UTF-8 prefix bytes that require checking of special constraints on the immediately following suffix byte, i.e., the prefix bytes hexadecimal E0, ED, F0 and F4. The following definition can be used to distinguish these cases from other legal cases of 3-byte and 4-byte prefixes.

$$u8special(i) = \frac{\neg u8bit6(i) \wedge \neg (u8bit4(i) \oplus u8bit7(i)) \wedge}{(u8bit3(i) \vee (\neg (u8bit4(i) \oplus u8bit5(i)))} \tag{4.16}$$

In accordance with one or more embodiments of the present invention, creating property streams corresponding to each of these equations may be performed routinely by one of ordinary skill in the art without undue experimentation utilizing the disclosure herein, including that provided in Section 3.1. One or more embodiments of the present invention may implement a UTF-8 byte classification module as a logic circuit in accordance with the description of Section 3.1.3.

4.2 UTF-8 Validation

UTF-8 validation requirements can be expressed in terms of the UTF-8 byte classifications and scope expectations. Overall, eight violation conditions must be checked. The first two violation conditions identify invalid prefixes in ranges reserved for two-byte and four-byte sequences respectively; these are given by u8badpfx2 and u8badpfx4 as defined above.

The third and fourth violation conditions identify unpaired UTF-8 prefix and suffix bytes. The third violation condition identifies positions at which a suffix byte is expected, but does not occur. The fourth violation condition identifies positions at which a suffix byte occurs, but is not expected. Both the third and fourth violation conditions can be checked at once using a logical xor operation.

$$anyscope(i) = \frac{u8scope22(i) \vee u8scope32(i) \vee u8scope33(i) \vee}{u8scope42(i) \vee u8scope43(i) \vee u8scope44(i)} \tag{4.17}$$

$$u8\text{mismatch}(i) = anyscope(i) \oplus u8\text{suffix}(i) \tag{4.18}$$

The fifth through eighth violation conditions represent constraints on the first UTF-8 suffix byte whenever the UTF-8 prefix byte has one of the hexadecimal values E0, ED, F0, and F4, respectively. In each case, the suffix byte is constrained to a particular subset of the 80-BF range generally used for UTF-8 suffix bytes. The permitted suffix ranges in each case are E0:A0-BF, ED:80-9F, F0:90-BF, F4:80-8F. Correspondingly, the disallowed suffix ranges in each case are E0:80-9F, ED:A0-BF, F0:80-8F, F4:90-BF.

In the case of the E0 and ED prefixes, note that the permissible suffixes are complementary. That is, bit 2 of the suffix must be set (A0-BF), whenever bit 4 of the prefix is not set (E0), while bit 2 of the suffix must not be set (80-9F), whenever bit 4 of the prefix is set (ED). This allows a single definition to handle both cases.

$$u8badsfx32(i) = \frac{u8scope32(i) \wedge u8special(i-1) \wedge}{\neg(u8bit4(i-1) \oplus u8bit2(i))} \quad (4.19)$$

Similarly, the final two violation conditions also involve complementary requirements on suffixes. In the case that bit 4 of the prefix is not set (F0), neither bit 2 nor bit 3 of the suffix may be set, while in the case that bit 4 of the prefix is set (F4), at least one of bit 2 or bit 3 of the suffix must be set.

$$u8badsfx42(i) = \frac{u8scope42(i) \wedge u8special(i-1) \wedge}{\neg(u8bit4(i-1) \oplus (u8bit2(i) \vee u8bit3(i)))} \quad (4.20)$$

Overall, these definitions permit the set of all UTF-8 violations to be identified as a disjunction of the bitstreams for each of the conditions identified above.

$$u8invalid(i) = \frac{u8badpfx2(i) \vee u8badpfx4(i) \vee u8mismatch(i) \vee}{u8badsfx32(i) \vee u8badsfx42(i)} \quad (4.21)$$

One or more embodiments of the present invention are one or more methods that implement these equations; which methods may be implemented routinely by one of ordinary skill in the art without undue experimentation utilizing the disclosure herein, including that provided in Section 3.1. Once all blocks in a buffer have been processed, the bit detection facility of Section 3.3 may be applied. If an error is detected, further processing of the input may be aborted, and an error signal may be returned to an application. In addition, one or more methods of the present invention involve carrying out one or more of the above-described validation methods in a UTF-8 validation unit (utilizing software instructions, hardware instructions, or a combination of software and hardware instructions).

One or more embodiments of the present invention may implement a UTF-8 validation module as a logic circuit in accordance with the description of Section 3.1.3.

4.3 UTF-8 Decoding

A UTF-8 decoding method, which may be carried out, for example and without limitation, in a UTF-8 decoding unit (utilizing software instructions, hardware instructions, or a combination of software and hardware instructions), allows an application to determine a sequence of Unicode code points corresponding to a UTF-8 data stream. This is generally useful, among other things, as a preprocessing step in converting to an alternative encoding form or in returning individual character or string values to the application.

FIG. 8 shows a correspondence between UTF-8 code units and code point byte values. The different sequence types are aligned so that the last bytes of the sequences line up; this serves to highlight common patterns across code sequences.

Note that FIG. 8 shows one code point byte value corresponding to each UTF-8 byte. It is thus convenient to define a u8-indexed property stream cpbyte(i) to be a code point byte value, as shown, corresponding to u8data(i). Similarly, cpbit0(i) through cpbit7(i) are defined as parallel bit streams for bit0 through bit7, respectively, of cpbyte(i).

As shown in FIG. 8, there are some common patterns between byte classes. It is thus convenient to define terms to capture these commonalities.

$$u8lastsuffix(i) = u8scope22(i) \vee u8scope33(i)$$
$$\vee u8scope44(i) \quad (4.22)$$

$$u8lastbyte(i) = u8lastsuffix(i) \vee u8unibyte(i) \quad (4.23)$$

$$u8butlastsuffix(i) = u8scope32(i) \vee u8scope43(i) \quad (4.24)$$

$$u8butlastbyte(i) = u8butlastsuffix(i) \vee u8prefix2(i) \quad (4.25)$$

Decoding is accomplished through individual bit equations for cpbit0 through cpbit7. Each equation could be defined using a disjunction of ten terms, one each defining the value of the bit for one of the ten byte classifications. However, the common patterns make for considerable simplification of the equations. For example, cpbit0 is 0 except for last and butlast suffix bytes. In the three cases of a last suffix byte, cpbit0 is bit s as shown in FIG. 8; in each case this bit corresponds to bit6 of the preceding u8data byte. In the two cases of a butlast suffix byte, cpbit0 is bit j, corresponding to bit4 of the preceding u8data byte.

$$cpbit0(i) = \frac{(u8lastsuffix(i) \wedge u8bit6(i-1)) \vee}{(u8butlastsuffix(i) \wedge u8bit4(i-1))} \quad (4.26)$$

Definitions of other bits follow similar patterns.

$$cpbit1(i) = \begin{matrix}(u8lastsuffix(i) \wedge u8bit7(i-1)) \vee \\ (u8butlastsuffix(i) \wedge u8bit5(i-1)) \vee \\ (u8unibyte(i) \wedge u8bit1(i))\end{matrix} \quad (4.27)$$

$$cpbit2(i) = \frac{(u8lastbyte(i) \wedge u8bit2(i)) \vee}{(u8butlastsuffix(i) \wedge u8bit6(i-1))} \quad (4.28)$$

$$cpbit3(i) = \begin{matrix}(u8lastbyte(i) \wedge u8bit3(i)) \vee \\ (u8butlastsuffix(i) \wedge u8bit7(i-1)) \vee \\ (u8scope42(i) \wedge u8bit5(i-1))\end{matrix} \quad (4.29)$$

$$cpbit4(i) = \begin{matrix}(u8lastbyte(i) \wedge u8bit4(i)) \vee \\ (u8butlastsuffix(i) \wedge u8bit2(i)) \vee \\ (u8scope42(i) \wedge u8bit6(i-1))\end{matrix} \quad (4.30)$$

$$cpbit5(i) = \begin{matrix}(u8lastbyte(i) \wedge u8bit5(i)) \vee \\ (u8butlastbyte(i) \wedge u8bit3(i)) \vee \\ (u8scope42(i) \wedge u8bit7(i-1))\end{matrix} \quad (4.31)$$

$$cpbit6(i) = \begin{matrix}(u8lastbyte(i) \wedge u8bit6(i)) \vee \\ (u8butlastbyte(i) \wedge u8bit4(i)) \vee \\ (u8scope42(i) \wedge u8bit2(i))\end{matrix} \quad (4.32)$$

$$cpbit7(i) = \begin{matrix}(u8lastbyte(i) \wedge u8bit7(i)) \vee \\ (u8butlastbyte(i) \wedge u8bit5(i)) \vee \\ (u8scope42(i) \wedge u8bit3(i))\end{matrix} \quad (4.33)$$

Creating a cpbyte byte stream may be carried out by one of ordinary skill in the art routinely and without undue experimentation using the parallel bit stream to serial byte transposition described in Section 3.8.

One or more embodiments of the present invention may implement a UTF-8 decoding module as a logic circuit in accordance with the description of Section 3.1.3.

4.4 UTF-16 Data Streams

A UTF-16 processing method that is fabricated in accordance with one or more embodiments of the present invention allows Unicode text data to be processed in terms of any of the UTF-16, UTF-16LE or UTF-16BE encoding schemes. These schemes differ in whether the bytes of each 16-bit code unit occur in little-endian or big-endian order, and whether a byte-order mark may be used to signal endianness.

To read input from a UTF-16 data source in accordance with one or more embodiments of the present invention, the source is opened in one of the UTF-16, UTF-16LE or UTF-16BE modes. A value for endianness is determined in accordance with any one of a number of methods that are well known to those of ordinary skill in the art and stored. When opened in UTF-16 mode, big-endian is stored as the initial default. However, examination of the first two bytes of input may override this setting. If the first two bytes of input are hexadecimal FF and FE, respectively, then this is considered to be a byte order mark indicating little-endianness. The mode is set to little-endian, and the byte order mark is discarded. If the first two bytes of input are hexadecimal FE and FF, respectively, the mode is maintained as big-endian, and the first two bytes are discarded. Otherwise, the first two bytes of input are kept and the default mode of big-endian is maintained.

When a data stream is opened in UTF-16LE mode, the endianness is set to little-endian. No inspection of the first two input bytes for a byte order mark is made. Similarly, when a data stream is opened in UTF16-BE mode, the endianness is set to big-endian, and input processing proceeds directly without examination for a potential byte order mark.

In accordance with one or more embodiments of the present invention, conversion of UTF-16 input data to parallel bit streams proceeds by first computing u16-indexed parallel byte streams u16byte0 and u16byte1 for the most significant and least significant bytes of each logical UTF-16 code unit. In big-endian mode, the u16byte0 byte stream consists of the first byte of each 16-bit value from the UTF-16 data source, while the u16byte1 byte stream consists of the second byte of each such 16-bit value. In little-endian mode, the byte order is reversed. On typical SIMD architectures, a single SIMD pack operation is required for each two consecutive registers full of consecutive UTF-16 data. Using the idealized instruction set architecture, for example, the operations simd_pack/16(x/h, y/h) and simd_pack/16(x/l, y/l), respectively, compute u16byte0 and u16byte1 byte stream segments from an original big-endian UTF-16 segment contained in registers x and y.

The serial byte to parallel bit stream unit of Section 3.2 is then applied to generate bit streams. Bit streams u16bit0 through u16bit7 are generated by transposition from the u16byte0 byte stream, while bit streams u16bit8 through u16bit15 are generated by transposition from the u16byte1 byte stream.

4.5 UTF-16 Surrogate Pairs and Validation

Unicode code points in ranges 0-D7FF hexadecimal and E000 to FFFF hexadecimal are directly represented as 16-bit values in UTF-16. Unicode code points in a range 10000 to 10FFFF hexadecimal are represented as surrogate pairs; i.e., two consecutive UTF-16 code units in the respective ranges D800-DBFF and DC00-DFFF. UTF-16 validation requires that code units in an overall range D800-DFFF only occur in accordance with the surrogate pair convention.

In accordance with one or more embodiments of the present invention, the following definitions classify UTF-16 code units as low or high surrogates for validation and decoding.

$$u16surrogate(i) = \begin{array}{l} u16bit0(i) \wedge u16bit1(i) \wedge \neg u16bit2(i) \wedge \\ u16bit3(i) \wedge u16bit4(i) \end{array} \quad (4.34)$$

$$u16surrogatelo(i) = u16surrogate(i) \char`\^ \neg u16bit5(i) \quad (4.35)$$

$$u16surrogatehi(i) = u16surrogate(i) \char`\^ u16bit5(i) \quad (4.36)$$

There are two potential types of invalid UTF-16 code unit sequences. The first is a sequence with a low surrogate code unit that is not immediately followed by a high surrogate. The second is an occurrence of a high surrogate that is not immediately preceded by a low surrogate. Both conditions can be determined using a single exclusive- or test that identifies mismatches of either kind.

$$u16invalid(i) = u16surrogatehi(i) \oplus u16surrogatelo(i-1) \quad (4.37)$$

One or more embodiments of the present invention may implement a UTF-16 validation module as a logic circuit in accordance with the description of Section 3.1.3.

4.6 UTF-32 Data Streams

A UTF-32 processing method that is fabricated in accordance with one or more embodiments of the present invention allows Unicode text data to be processed in terms of any of the UTF-32, UTF-32LE or UTF-32BE encoding schemes. The schemes differ in whether the bytes of each 32-bit code unit occur in little-endian or big-endian order, and whether a byte-order mark may be used to signal endianness.

In accordance with one or more embodiments of the present invention, to read input from a UTF-32 data source, the source is opened in one of the UTF-32, UTF-32LE or UTF-32BE modes. A value for endianness is also determined in accordance with any one of a number of methods that are well known to those of ordinary skill in the art and stored. When opened in UTF-32 mode, big-endian is stored as the initial default. However, examination of the first four bytes of input may override this setting. If the first four bytes of input are hexadecimal FF, FE, 00, and 00, in that order, then this is considered to be a byte order mark indicating little-endianness. The mode is set to little-endian, and the byte order mark is discarded. If the first four bytes of input are hexadecimal 00, 00, FE, and FF, in that order, the mode is maintained as big-endian, and the first four bytes are discarded. Otherwise the first four bytes of input are kept and the default mode of big-endian is maintained.

When a data stream is opened in UTF-32LE mode, the endianness is set to little-endian. No inspection of the first four input bytes for a byte order mark is made. Similarly, when a data stream is opened in UTF32-BE mode, the endianness is set to big-endian, and input processing proceeds directly without examination for a potential byte order mark.

UTF-32 code units represent Unicode code points directly. However, only 21 bits are required to represent all Unicode code points from hexadecimal 0000 through 10FFFF. In accordance with one or more embodiments of the present invention, a method for converting UTF-32 to parallel bit streams is thus designed to generate the 21 significant bit streams for further processing, while validating that the most 11 significant bits of each UTF-32 code unit are set to 0.

The conversion process proceeds by first computing four parallel byte streams u32byte0, u32byte1, u32byte2 and u32byte3 for the four bytes of each logical UTF-32 code unit, in order, from most significant to least significant. In big-endian mode, u32byte0, u32byte1, u32byte2 and u32byte3, respectively, consist of the first, second, third and fourth bytes of each 32-bit code unit from the UTF-32 data source. In little-endian mode, the byte order is reversed. In accordance with one or more embodiments of the present invention, these conversions may be implemented readily by one of ordinary skill in the art using straightforward packing operations of SIMD processors.

Corresponding to the most significant 8 bits of each code unit, the u32byte0 stream is used only to validate that all bits are zero. The serial byte to parallel bit stream unit of Section 3.2 is applied to each of the u32byte1, u32byte2 and u32byte3 streams to generate three corresponding sets of eight parallel bit streams. The individual bit streams in the three sets are labeled u32bit8 through u32bit15, u32bit16 through u32bit23, and u32bit24 through u32bit31, respectively. However, streams u32bit8 through u32bit10 are used only to validate that all bits are zero. The streams labeled u32bit11 through u32bit31 hence comprise the 21 significant bit streams of Unicode.

Once the UTF-32 code units are converted to parallel bit streams, a final validation step is carried out to ensure that code points are confined to the ranges 0000 to D7FF hexadecimal and E000 to 10FFFF hexadecimal.

$$u32invalid(i) = \begin{array}{l} \neg u32bit11(i) \wedge \neg u32bit12(i) \wedge \neg u32bit13(i) \wedge \\ \neg u32bit14(i) \wedge \neg u32bit15(i) \wedge \\ u32bit16(i) \wedge u32bit17(i) \wedge \neg u32bit18(i) \wedge \\ u32bit19(i) \wedge u32bit20(i) \end{array} \quad (4.38)$$

One or more embodiments of the present invention may implement a UTF-32 validation module as a logic circuit in accordance with the description of Section 3.1.3.

4.7. Transcoding

One or more embodiments of the present invention include methods for transcoding between the UTF-8, UTF-16 and UTF-32 representations of Unicode.

An example of UTF-8 to UTF-16 transcoding is illustrative. FIG. 9 shows an input/output diagram of UTF-8 to UTF-16 bit-space transcoder 1000 (U8U16BIT 1000) that is fabricated in accordance with one or more embodiments of the present invention. U8U16BIT 1000 converts one 128 code unit block of validated UTF-8 input data 1001 into corresponding UTF-16 output data 1002. However, only complete UTF-8 code unit sequences are transcoded; any code units of an incomplete multibyte sequence at the end of the input block are ignored. The number of UTF-8 code units processed is provided as output u8count 1003, while the number of UTF-16 code units generated is provided as output u16count 1004. Input 1001 consists of eight parallel 128-bit segments of u8-indexed bit streams u8bit0 through u8bit7. Output 1002 consists of sixteen parallel 128-bit segments of u16-indexed bit streams u16bit0 through u16bit15. The first u16count 1004 positions of the output streams represent UTF-16 code units corresponding to the first u8count 1003 positions of the UTF-8 input.

Figure 10:
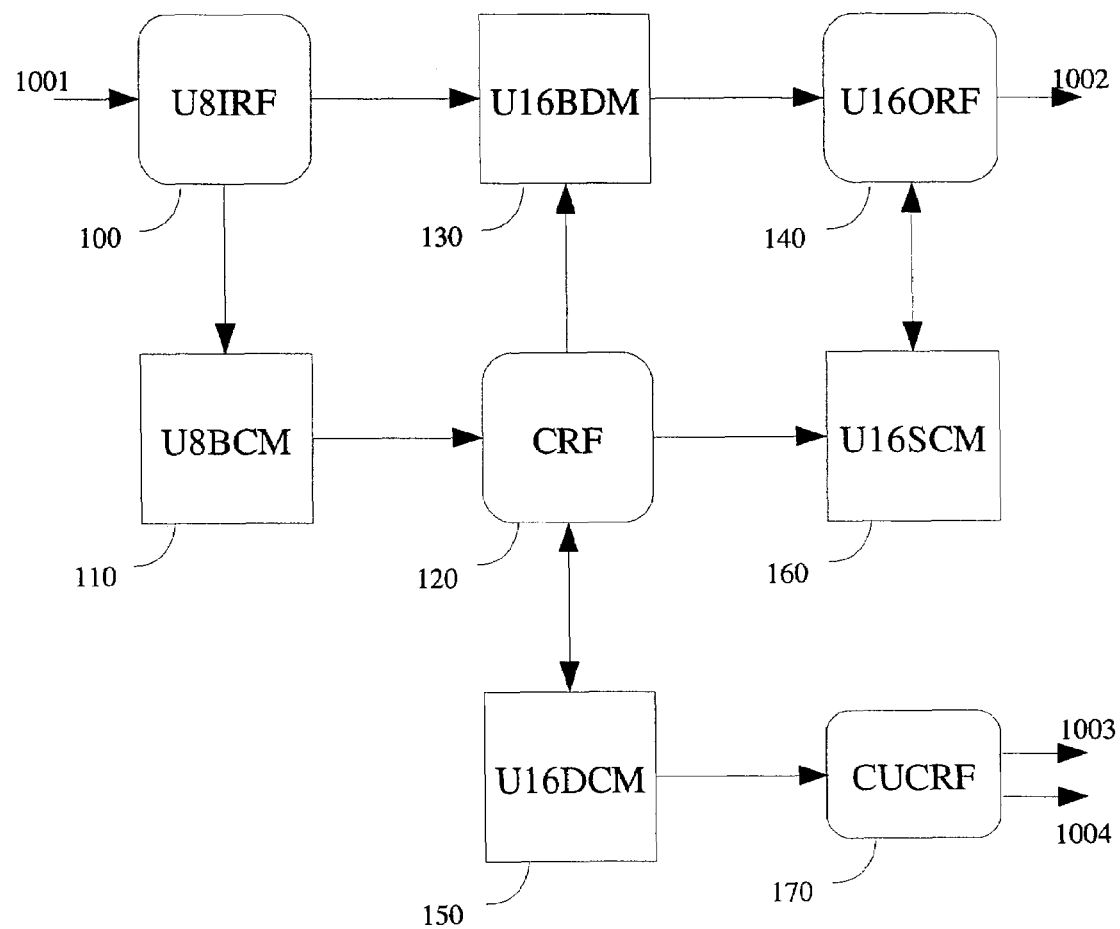
FIG. 10 shows a block diagram of an internal structure that is fabricated in accordance with one embodiment of the present invention of the UTF-8 to UTF-16 bit-space transcoder shown in FIG. 9.

FIG. 10 shows the internal structure of U8U16BIT 1000. A brief overview serves to introduce the modules of U8U16BIT 1000 and their roles; a detailed description follows below. U8U16BIT 1000 includes: three register files, UTF-8 Input Register File 100 (U8IRF 100), Control Register File 120 (CRF 120), and UTF-16 Output Register File 140 (U16ORF 140). Each of these register files comprise a set of 128-bit registers that store parallel 128-bit segments of bit stream data. In particular, in accordance with this embodiment, U8IRF 100 is initialized on input to store parallel 128-bit segments each of input data streams u8bit0 through u8bit7; and CRF 120 is used to store property stream segments that control the functions of UTF-16 Bit Decoder Module 130 (U16BDM 130) and UTF-16 Stream Compression Module 160 (U16SCM 160). The property stream segments stored in CRF 120 are prepared by UTF-8 Byte Classification Module 110 (U8BCM 110) and UTF-16 Deletion Control Module (U16DCM 150). Specifically, U16BDM 130 prepares initial values of UTF-16 stream segments in u8-indexed form, and stores them in U16ORF 140. U16SCM 160 operates on the UTF-16 stream segments stored in U16ORF 140 to convert them to u16-indexed form. Code Unit Count Register File 170 (CUCRF 170) comprises two 8-bit registers to store integers reporting the number of UTF-8 and UTF-16 code units involved in the transcoding process.

After input of u8bit0 through u8bit7 stream segments into U8IRF 100, U8BCM 110 computes parallel bit stream segments that classify the code units at each position in accordance with the equations of Section 4.1, namely u8unibyte, u8suffix, u8prefix, u8prefix2 through u8prefix4 and u8scope22 through u8scope44. U8BCM 100 stores the computed property stream segments in CRF 120 for use by U16BDM 130 and U16DCM 150.

Upon completion of code unit classification by U8BCM 110, U16BDM 130 computes a u8-indexed intermediate form of the final UTF-16 data in accordance with the specifications shown in FIG. 11. The intermediate form consists of two sets of bit stream segments labeled u16hi and u16lo in FIG. 11 which comprises eight bit stream segments each, u16hi0 through u16hi7 and u16lo0 through u16lo7. For each class of UTF-8 byte, FIG. 11 shows the bit patterns that exist at a code unit position of that class. The patterns for the u16hi0 through u16hi7 and u16lo0 through u16lo7 bits are shown in terms of the corresponding UTF-8 pattern of u8bit0 through u8bit7. Note that, in multibyte sequences, some values of u16hi or u16lo bits are defined in terms of UTF-8 bit values at prior positions within the code unit sequence.

One complexity in the decoding process is the transformation of a five-bit efghi pattern in UTF-8 data into a four-bit abcd pattern in the UTF-16 form, where efghi=abcd−1. As shown in the table of FIG. 11, the efg bits occur as u8bit5 through u8bit7 at u8prefix4 positions, while the hi bits occur as u8bit2 and u8bit3 at u8scope42 positions. The transformed ab and cd bit patterns are realized as u16hi6/7 and u16lo0/1 bits at u8scope42 positions. In accordance with the constraints of valid UTF-8 data, the value of efghi is in a range 00001 through 10000, so the value of abcd=efghi−1 will be in the range 0000 through 1111.

The following equations detail the operation of U16BDM 130. The values of u8lastsuffix, and u8lastbyte are first determined in accord with equations 4.22 and 4.23.

$$u8surrogate(i) = u8scope42(i) \vee u8scope44(i) \quad (4.39)$$

$$u16hi0(i) = (u8scope33(i) \hat{\ } u8bit4(i-2)) \vee u8surrogate(i) \quad (4.40)$$

$$u16hi1(i) = (u8scope33(i) \hat{\ } u8bit5(i-2)) \vee u8surrogate(i) \quad (4.41)$$

$$u16hi2(i) = u8scope33(i) \hat{\ } u8bit6(i-2) \quad (4.42)$$

$$u16hi3(i) = (u8scope33(i) \hat{\ } u8bit7(i-2)) \vee u8surrogate(i) \quad (4.43)$$

$$u16hi4(i) = (u8scope33(i) \hat{\ } u8bit2(i-1)) \vee u8surrogate(i) \quad (4.44)$$

$$u16hi5(i) = (u8lastsuffix(i) \hat{\ } u8bit3(i-1)) \vee u8scope44(i) \quad (4.45)$$

The definitions of u16hi6, u16hi7, u16lo1 and u16lo2 incorporate the logic for abcd=efghi−1 at u8scope42 positions. The least significant bit is always negated, while other bits are negated depending on whether a borrow is generated.

$$u16lo1(i) = \begin{array}{l}(u8unibyte(i) \wedge u8bit1(i)) \vee \\ (u8lastsuffix(i) \wedge u8bit7(i-1)) \vee \\ (u8scope42(i) \wedge (\neg u8bit3(i)))\end{array} \quad (4.46)$$

$$u16borrow0(i) = u16lo1(i) \quad (4.47)$$

$$u16lo0(i) = \begin{array}{l}(u8lastsuffix(i) \wedge u8bit6(i-1)) \vee \\ (u8scope42(i) \wedge (u8bit2(i)) \oplus u16borrow0(i))\end{array} \quad (4.48)$$

$$u16borrow1(i) = u16lo1(i) \wedge \neg u8bit2(i) \quad (4.49)$$

$$u16hi7(i) = \begin{array}{l}(u8lastbyte(i) \wedge u8bit7(i)) \vee \\ (u8scope42(i) \wedge (u8bit7(i-1) \oplus u16borrow1(i)))\end{array} \quad (4.50)$$

$$u16borrow2(i) = u16lo0(i) \wedge \neg u8bit7(i-1) \quad (4.51)$$

$$u16hi6(i) = \begin{array}{l}(u8lastsuffix(i) \wedge u8bit4(i-1)) \vee \\ (u8scope42(i) \wedge (u8bit6(i-1) \oplus u16borrow2(i)))\end{array} \quad (4.52)$$

The remaining equations are:

$$u16lo2(i) = \begin{array}{l}(u8lastbyte(i) \wedge u8bit2(i)) \vee \\ (u8scope42(i) \wedge u8bit4(i))\end{array} \quad (4.53)$$

$$u16lo3(i) = \begin{array}{l}(u8lastbyte(i) \wedge u8bit3(i)) \vee \\ (u8scope42(i) \wedge u8bit5(i))\end{array} \quad (4.54)$$

$$u16lo4(i) = \begin{array}{l}(u8lastbyte(i) \wedge u8bit4(i)) \vee \\ (u8scope42(i) \wedge u8bit6(i))\end{array} \quad (4.55)$$

$$u16lo5(i) = \begin{array}{l}(u8lastbyte(i) \wedge u8bit5(i)) \vee \\ (u8scope42(i) \wedge u8bit7(i))\end{array} \quad (4.56)$$

$$u16lo6(i) = \begin{array}{l}(u8lastbyte(i) \wedge u8bit6(i)) \vee \\ (u8scope42(i) \wedge u8bit2(i+1))\end{array} \quad (4.57)$$

$$u16lo7(i) = \begin{array}{l}(u8lastbyte(i) \wedge u8bit7(i)) \vee \\ (u8scope42(i) \wedge u8bit3(i+1))\end{array} \quad (4.58)$$

U16BDM 130 computes the bit stream segments for u16hi0 through u16hi7 and u16lo0 through u16lo7 and stores the resulting values in U16ORF 140.

Once the u16lo and u16hi computations are complete, the principal remaining task is to convert the stored values from the intermediate u8-indexed form to the final u16-indexed form through parallel bit deletion. U16DCM 150 computes u16delmask to identify positions at which deletions take place. Deletions take place at all code unit positions marked delete in FIG. 11, namely at u8prefix positions as well as u8scope32 and u8scope43 positions. In addition, if an incomplete four-byte UTF-8 sequence is found in the final one to three code-unit positions of the block, deletion at the u8scope42 position of this code unit sequence is specified. To accommodate this latter concern, it is convenient to treat u8suffix(i) as having the value 0 for $i \geq 128$.

$$u16delmask(i) = \begin{array}{l}u8prefix(i) \vee u8scope32(i) \vee u8scope43(i) \vee \\ (u8scope42(i) \wedge \neg u8suffix(i+2))\end{array} \quad (4.59)$$

Based on this deletion mask, U16DCM 150 further computes deletion information as described in section 3.7 and stores this information in CRF 120. In accordance with one or more embodiments, this deletion information is determined based on the method of central result induction. Seven 128-bit sets of rotation counts are stored in CRF 120, corresponding to six steps of central result induction (combining 64 2-bit results into 32 4-bit results, combining 32 4-bit results into 16 8-bit results and so on until one 128-bit central result is computed), followed by a final rotation value to convert the 128-bit central result into a 128-bit left result.

U16DCM 150 further uses u16delmask to determine the number of UTF-16 code units that result from the transcoding process. One UTF-16 code unit is produced for every 0bit in u16delmask. The u16delmask is inverted, the bit counting method and/or unit of section 3.4 is applied thereto and the result is stored in the u16count register of CUCRF 170.

U16DCM 150 also computes the number of UTF-8 code units that are transcoded, and stores this value in the u8count register of CUCRF 170. The u8count value is determined by a bit count operation applied to the inverse of u8incomplete, defined as follows.

$$u8incomplete(i) = \begin{array}{l}(u8prefix(i) \wedge \neg u8suffix(i+1)) \vee \\ (u8prefix3or4(i) \wedge \neg u8suffix(i+2)) \vee \\ (u8prefix4(i) \wedge \neg u8suffix(i+3))\end{array} \quad (4.60)$$

U16SCM 160 is responsible for conversion of u8-indexed u16hi and u16lo data sets into the final set of sixteen parallel u16-indexed bit stream segments u16bit0 through u16bit15. The parallel deletion method and/or unit of section 3.8 is applied to each of the sixteen stream segment registers of U16ORF 140. This effectively performs the conversion from u8-indexed form to u16-indexed form in place. One or more embodiments apply the method of central result induction using the rotation counts previously computed and stored in CRF 120 by U16DCM 130.

With the completion of stream compression by U16SCM 160 and the generation of u8count and u16count by U16DCM 130, the required outputs of U8U16BIT 1000 are stored and available in U16ORF 140 and CUCRF 170.

One or more embodiments implement U8U16BIT 1000 using operations of a 128-bit idealized SIMD instruction set processor. One or more alternative embodiments implement U8U16BIT 1000 or one or more components thereof using dedicated logic circuitry in accordance with the descriptions of Sections 3.1.3. 3.4 and/or 3.7.

In accordance with one or more further embodiments of the present invention, a combination of bit-space and byte-space techniques are used to implement byte-space transcoding of UTF-8 byte streams to corresponding UTF-16 doublebyte streams. A byte-space transcoder takes UTF-8 byte stream data as input and first converts it to parallel bit-stream form using the methods and/or unit of Section 3.2. One or more embodiments employ a bit-space transcoder to produce UTF-16 data in the form of 16-parallel bit streams. The high eight and low eight bit streams are each transposed to serial byte form using the methods and/or unit of Section 3.8. The two byte streams are interleaved using simd_merge operations to produce the UTF-16 doublebyte stream. One or more alternative embodiments use a modified bit-space transcoder that omits conversion to u16-indexed form in bit-space. Transposition of u8-indexed bit streams to doublebyte-space is performed prior to deletion of data corresponding to u8prefix, u8scope32 and u8scope43 positions. Conversion to u16-form is then carried out in doublebyte space, employing index vectors to select nondeleted bytes as described in Section 3.7.

In accordance with one or more embodiments of the present invention, an ASCII optimization is implemented in transcoding. Using the bit detection method of section 3.3, blocks or buffers may be examined to determine whether the entire block or buffer consists of characters within the ASCII subset of UTF-8 or not. Any one bit in u8bit0 signifies a non-ASCII character; if no such bit is detected the block or buffer may be processed in a simplified fashion. For example, a bit-space transcoder may optimize the processing of ASCII blocks or buffers by setting all u16hi bit streams to 0, all u16lo bit streams to the values of the corresponding u8 bit streams and skipping the bit deletion step (as there are no u8prefix, u8scope32 or u8scope43 positions within the ASCII block or buffer.) One or more embodiments of byte-space transcoding optimize processing of ASCII blocks or buffers by direct insertion of null bytes into the ASCII byte stream, bypassing bit-space transformations.

In accordance with one or more embodiments of the present invention, a quadbyte optimization is implemented in transcoding. Using the bit detection method of section 3.3, blocks or buffers may be examined to determine whether the entire block is free of four-byte UTF-8 sequences or not. If the block starts with other than a suffix byte and u8prefix4 consists entirely of zero bits, transcoding is carried out by simplified routines that omit logic for processing quadbyte sequences.

4.8 Validation, Decoding and/or Transcoding as Operating System Services

One or more embodiments of the present invention may provide validation, decoding and/or transcoding as part of an operating system or as a part of standard library services. In accordance with one or more such embodiments of the present invention, a general purpose transcoding service may be implemented in accordance with conventions of the iconv specification. In accordance with one or more such embodiments, an additional transcoding service may implement transcoding services to or from Unicode formats and a plurality of other non-Unicode character encodings. In accordance with one or more such embodiments, such additional transcoding service may employ parallel bit stream methods following one or more of the techniques described previously, or it may employ standard techniques well-established in the prior art. Transcoding between different non-Unicode character encodings may be implemented by a two-step process involving decoding the source character representation to Unicode code points following by encoding of these code points according to the requirements of the destination character encoding.

4.9 Validation, Decoding and/or Transcoding Virtual Machine Services

One or more embodiments of the present invention may provide validation, decoding and/or transcoding as services of a virtual machine or run-time environment. In accordance with one or more such embodiments, the virtual machine or run-time environment may standardize on a particular internal representation of characters such as, for example and without limitation, UTF-16. In accordance with one or more such embodiments, I/O services provided by the virtual machine or run-time environment may automatically convert to and from the standard internal representation to that required for input or output.

4.10 Validation, Decoding and/or Transcoding Appliances

One or more embodiments of the present invention may provide validation, decoding and/or transcoding as services within a network appliance. In accordance with one or more embodiments, a local area network may be configured to standardize on a particular Unicode transformation format or other coded character set representation for one or more classes of application file. Transcoding services within a network appliance may be used to convert to or from this representation whenever logical data packets are received from, or sent to, a wide area network to which the local area network is connected. Applications executing within the local area network may also use the services of the network appliance. Transcoding between different non-Unicode character encodings may be implemented by a two-step process involving decoding the source character representation to Unicode code points following by encoding of these code points according to the requirements of the destination character encoding.

4.11 Validation and/or Transcoding in XML Processors

One or more embodiments of the present invention integrate validation and/or transcoding within an XML processor. An XML processor accepts input data in either UTF-8 or UTF-16, and may accept data using any of a plurality of other encodings. In accordance with one or more such embodiments, an XML processor provides parsed element and text data to applications in a UTF-16 representation or other character encoding in accordance with an application programmer interface (API). Whenever the input character encoding differs from the API character encoding, the XML processor transcodes data from the input form to the API form. Prior to, or during, transcoding, validation of character data is performed to ensure that character data is valid in accord with encoding requirements or that an error condition is otherwise signaled.

4.12 Validation, Decoding and/or Transcoding in Office Software

One or more embodiments of the present invention integrate validation, decoding and/or transcoding within an office application such as, for example and without limitation, a word processor, a spreadsheet, a database, or presentation software. The office application defines an internal document representation that is a preferred form for working with documents in memory and also defines a native file format used as a preferred form for storing working documents. One or more such embodiments may use the XML-based Open Document Format of OASIS as a native format, while other embodiments may use Microsoft Office OpenXML. The office application provides file import and export filters for a variety of other data formats used in the industry. Whenever the character encoding of an input file differs from the encoding required by the internal document representation, transcoding of the input form to the internal form is performed. Whenever the character encoding of an output file differs from the encoding required by the internal document representation, transcoding is integrated into the output process appropriately.

4.13 Validation, Decoding and/or Transcoding in Database Systems

One or more embodiments of the present invention integrate validation, decoding and/or transcoding within database systems. For example, SQL CHARACTER SET specifications at the server, database, table and column levels allow applications to store data in any of a plurality of character encodings, and also to mix encodings within applications. SQL CONVERT operations directly invoke a transcoding unit fabricated in accordance with one or more such embodiments to produce character data in the required encoding for a server, database, table or column.

4.14 Validation, Decoding and/or Transcoding in Portable Communication Devices

One or more embodiments of the present invention integrate validation, decoding and/or transcoding within portable communication devices such as cellphones, personal digital assistants or wireless e-mail devices. In general, these devices may send and receive character stream data over a network.

Validation, decoding, and/or transcoding may be invoked by the device to ensure that character stream data received from the network is in the correct form for processing by the communication software of the device. Transcoding may also be invoked to convert character stream data from the native format used by the device to the form required for transmission over a network.

4.15 Validation and Transcoding in Textbase Acquisition Systems

One or more embodiments of the present invention integrate validation and transcoding in text acquisition systems. In general, these systems acquire and integrate text from a variety of sources into a unified textbase. Upon retrieval of text data from a particular source, a validation step is applied to ensure that the text data is correctly represented in accord with the character encoding scheme used by that source. In the event that the encoding scheme used by the source is not that used internally by the textbase, transcoding is applied to convert the textual data from the external form used by the data source into the internal form used by the textbase.

5. One or More Embodiments of Idealized SIMD Architecture 5.1 Embodiments Using Existing SIMD Architectures In accordance with one or more embodiments of the present invention, the idealized SIMD instruction set architecture described in Section 2. are implemented through a sets of macros using existing SIMD architectures. For example, the idealized instruction set architecture with 128 bit registers may be implemented as a set of macros using the Altivec instruction set of the Power PC, using the C language interface. Each instruction of the idealized architecture maps to a set of three-argument macros, whose names are of the form simd_OP_W_XY, where OP is the operation name, W is the field-width (operation modifier) and X and Y are codes for the two operand modifiers, in order. The code "h" specifies the "/h" half-operand modifier, the code "l" specifies the "/l" half-operand modifier and the code "x" specifies no operand modifier. The arguments to each macro consist of the destination register, and the two operand registers of the idealized instruction. Thus, an idealized instruction r=simd_pack/4(a/h, b) would map to the macro call simd_pack__4_hx(r, a, b) using this naming scheme.

The macros are conveniently organized by instruction/field-width combinations. For each such combination, there is a set of nine macros for the different pairs of operand modifier codes: hh, hl, hx, lh, ll, lx, xh, xl, xx. Of these, the xx macro represents a base form in which neither operand is modified before applying the instruction logic. Each of the other forms may be implemented in terms of the base form after applying operand modifications in accord with the "l" and "h" codes.

The operand modifications associated with "l" codes are implemented using logical and operations to mask off the high-order n/2 bits of each n-bit field. The masks consist of alternating patterns of n/2 zeroes followed by n/2 ones for the full Altivec register width of 128 bits. For example, the "l" code for 4-bit fields corresponds to applying a mask consisting of 16 bytes each having the hexadecimal value 0x33.

The operand modifications associated with "h" codes are implemented using shift right logical operations, followed by a masking operation where necessary. The shift constant is n/2 bits, i.e., half the field width. Where possible (i.e., with 8, 16, 32, and 128 bit field widths on the Altivec) the field width of the Altivec instruction is chosen to match that of the idealized instruction. No subsequent masking is required in these cases. In the other cases, an Altivec shift with a larger field width is used, followed by application of the masking operation associated with the "l" code for the given field width.

When an instruction/field-width combination is directly available in the Altivec instruction set (i.e., generally with 8, 16 and 32 bit field widths), the implementation strategy is straightforward. The "xx" macros map directly to this Altivec instruction, while the other forms first apply the required operand modifications as described above. FIG. 12 shows the general pattern with the example of the nine macros for the case of simd_add/16.

The general pattern is simplified in some instances when the semantics of an instruction mean that the high n/2 bits of a particular operand play no role. The "/l" operand modifier has no effect in such instances. For example, this is true for the shift operand (second operand) in the various shift and rotate instructions. As a consequence, the macros ending in "l" may be simplified to the equivalent "x" versions that perform no modification of the second operand. A similar simplification applies for both operands of simd_pack instructions (under the truncation model of conversion). Implementation of idealized instructions for 4-bit fields generally proceeds by combining the results from two applications of the corresponding Altivec instruction on 8-bit fields. One such application handles the high 4-bit field of each byte, while the second handles the corresponding low 4-bit fields. Masking and/or shifting operations are used to position the 4-bit field values appropriately for applying the 8-bit instruction. Where possible, the results are arranged so that they may be combined with a single vec_sel or vec_or operation. FIG. 13 shows the example of simd_srl__4.

In the case of 2-bit field widths, it is possible to combine results from four applications of Altivec operations on 8-bit fields. In most cases, however, it is simpler to use logic operations to determine each bit of the two bit field as a Boolean function of the four bits of the operands. For example, consider the subtraction $c_0c_1=a_0a_1-b_0b_1$ as an operation on 2-bit fields. The equation $c_1=a_1 \oplus b_1$ may be used to calculate the least significant bit while $c_0=a_0 \oplus b_0 \oplus (\neg a_1 \hat{} b_1)$ includes the borrow term in calculating the most significant bit. Implemented using SIMD logical operations, these calculations handle one bit each of the 64 two-bit fields within a 128-bit register. FIG. 14 shows the Altivec implementation combining these calculations for the simd_sub/2 operation. This figure also illustrates optimizations that may apply when both operands have modifiers.

Implementation of idealized instructions for 64-bit and 128-bit field widths is straightforward using similar techniques to those described above. Combining results of 32-bit arithmetic operations to produce results for 64-bits or 128-bits is well known in the prior art and can make use of Altivec operations such as vec_addc and vec_subc, designed to produce carries for the purpose. The Altivec does provide shift operations capable of working with 128-bit field widths. SIMD shifting of two 64-bit fields can be implemented by combining together the results of two 128-bit shifts in a fashion similar to the implementation of 4-bit shifts using operations on 8-bit field widths. Alternative embodiments may combine results of 32-bit shifts to produce 64-bit results.

6. Collected Discussion of One or More Embodiments of the Present Invention

Figure 15:
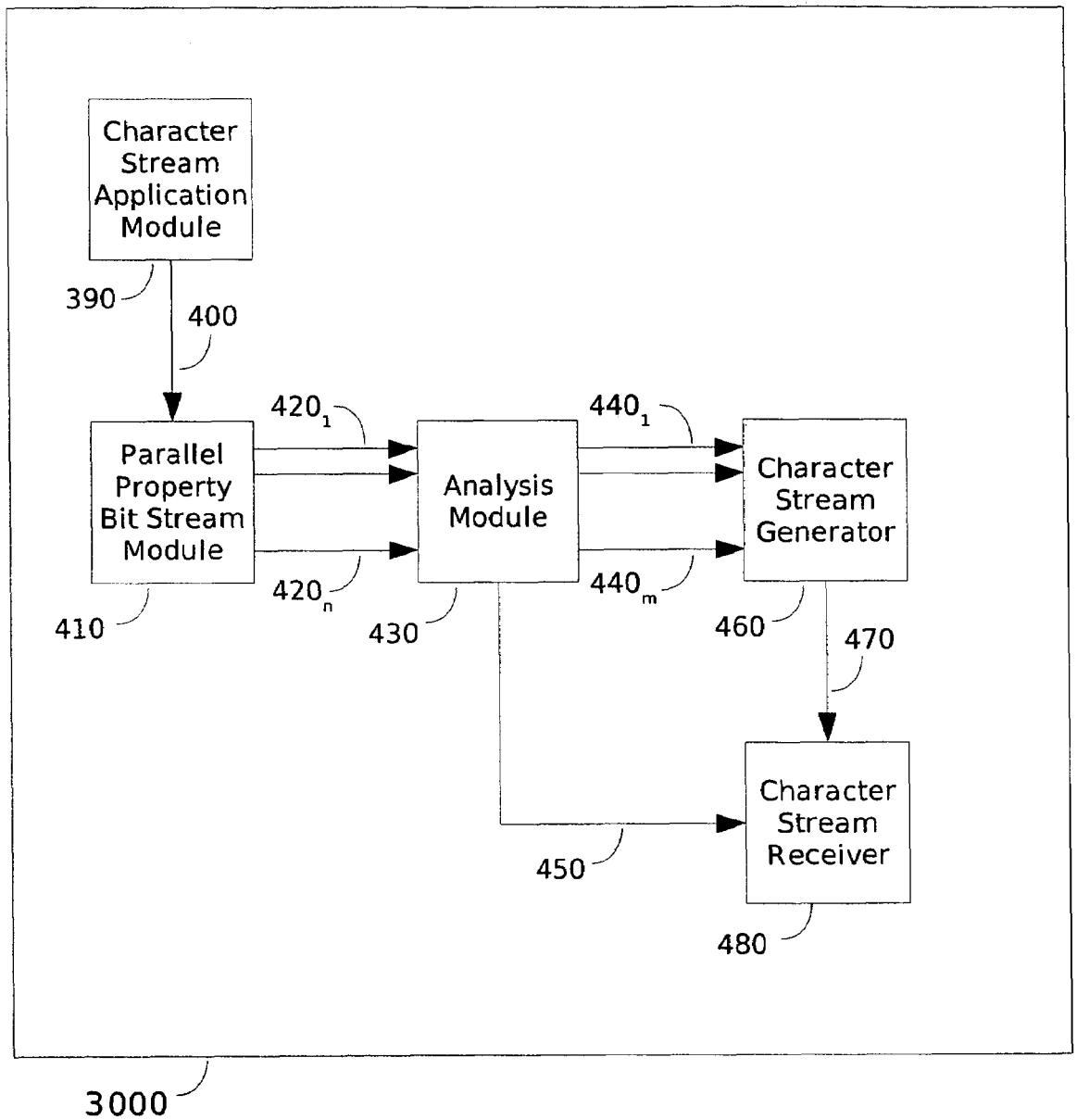
FIG. 15 shows a block diagram of a module that is fabricated in accordance with one or more embodiments of the specification.

FIG. 15 shows a block diagram of module 3000 that is fabricated in accordance with one or more embodiments of the specification. In accordance with one or more embodiments of the present invention, module 3000 may be: (a) an operating system or a library service package; (b) a virtual machine or a run-time environment; (c) a network appliance; (d) an XML processor; (e) an office application such as, for example and without limitation, a word processor, a spreadsheet, a database, or presentation software; (f) a database system; (g) a portable communication device such as, for example and without limitation, a cellphone, a personal digital assistant or a wireless e-mail device; and (h) a text acquisition system. The following describes the portion of module 3000 that pertains to character stream processing since methods for interfacing with the portion described herein and the rest of module 3000 are well known to those of ordinary skill in the art. Further, the specific manner in which the processing is utilized in such embodiments has been described above.

As shown in FIG. 15, character stream application module 390 of module 3000 applies character stream 400 as input to parallel property bit stream module 410 (character stream application module 390 is an appropriate part of, for example and without limitation, an operating system; a library service package; a virtual machine; a run-time environment; a network appliance; an XML processor; an office application such as, for example and without limitation, a word processor, a spreadsheet, a database, or presentation software; a database system; a portable communication device such as, for example and without limitation, a cellphone, a personal digital assistant or a wireless e-mail device; or a text acquisition system). As one of ordinary skill in the art can readily appreciate, the term "applied as input" is used in the broadest sense as transferred between co-located or distributed (as in systems and networks) hardware or software. In response, parallel property bit stream module 410 generates parallel property data streams (for example, parallel property bit streams) $420_1$ to $420_n$ in accordance with one or more embodiments of the present invention described herein. In accordance with one or more embodiments of the present invention, parallel property bit stream module 410 may be, for example, and without limitation, a software or a hardware module that is embodied in the manner described herein or in any manner that incorporate these teachings.

As further shown in FIG. 15, parallel property data streams $420_1$ to $420_n$ are applied as input to analysis module 430. Analysis module 430 performs one or more of the functions described herein such as, without limitation, validation, decoding and/or transcoding in the manner described herein. In response, analysis module 430 generates parallel property data streams (for example, parallel property bit streams) $440_1$ to $440_m$ and perhaps property detection property data stream 450. As was described above, for a UTF-8 to UTF-16 transcoding application, n may not be equal to m. Further, as one of ordinary skill may readily appreciate, property data stream 450 may be utilized, for example and without limitation, to indicate whether input is invalid. In accordance with one or more embodiments of the present invention, analysis module 430 may be, for example, and without limitation, a software or a hardware module that is embodied in the manner described herein or in any manner that incorporate these teachings.

As further shown in FIG. 15, parallel property data streams $440_1$ to $440_m$ are applied as input to character stream generator module 460. In response, character stream generator module 460 generates a character stream 470 in accordance with one or more embodiments of the present invention described herein. In accordance with one or more embodiments of the present invention, character stream generator module 460 may be, for example, and without limitation, a software or a hardware module that is embodied in the manner described herein or in any manner that incorporate these teachings. As one of ordinary skill in the art can readily appreciate, character stream 470 and/or property data stream 450 are applied as input to character stream receiver module 480 of module 3000 where character stream receiver module 480 is, for example and without limitation, an appropriate part of an operating system; a library service package; a virtual machine; a run-time environment; a network appliance; an XML processor; an office application such as, for example and without limitation, a word processor, a spreadsheet, a database, or presentation software; a database system; a portable communication device such as, for example and without limitation, a cellphone, a personal digital assistant or a wireless e-mail device; or a text acquisition system). As one or ordinary skill in the art can readily appreciate, the term "applied as input" is used in the broadest sense as transferred between co-located or distributed (as in systems and networks) hardware or software.

Although various embodiments that incorporate the teachings of the present invention have been shown and described in detail herein, those skilled in the art can readily devise many other varied embodiments that still incorporate these teachings. For example, although descriptions of various embodiments of the present invention were provided which utilize full block invariants, it should be understood that the present invention is not limited to such embodiments. In fact, it is within the spirit of the present invention to include various embodiments utilizing partial blocks. In addition, one of ordinary skill in the art can readily fabricate such embodiments utilizing partial blocks routinely and without undue experimentation in light of the description provided above.

Although various embodiments using parallel bit streams have been described herein, other embodiments employing property data streams consisting of bit pairs, nybbles or other data units may be fabricated by one of ordinary skill in the art in light of the teachings.

Further, as one of ordinary skill in the art can readily appreciate from the detailed description above, one or more embodiments of the present invention are designed to improve efficiency in text processing systems so that increases in throughput, reductions in hardware requirements and/or savings in energy consumption may be achieved. For example, for a fixed hardware configuration, one or more embodiments of the present invention may be employed to increase throughput of text processing applications on the configuration. However, if the throughput requirements are fixed and known, one or more embodiments of the present invention may be applied to reduce system cost by reducing the overall number of processors and/or the performance specifications that must be satisfied by each processor. Alternatively, if the primary constraint is that of energy consumption, one or more embodiments of the present invention may permit efficiencies to be achieved by reducing the time spent in high-power operating modes, allowing lower-power processors to be substituted and/or reducing the total number of processors required.

What is claimed is:

1. A method for processing a character stream comprising:
   forming, responsive to the character stream, a plurality of parallel property bit streams wherein each of the parallel property bit streams comprises bit values of a particular property associated with data values of the character stream; and
   processing the one or more parallel property bit streams.

2. The method of claim 1 wherein processing comprises:
   forming one or more further property streams by operating on one or more of the parallel property bit streams.

3. The method of claim 2 wherein operating comprises carrying out Boolean operations and/or shifting operations on one or more of the parallel property bit streams.

4. The method of claim 1 wherein processing comprises operating on a multiplicity of bits in one or more of the parallel property bits streams at the same time.

5. The method of claim 4 wherein operating on a multiplicity of bits comprises using simultaneous-instruction, multiple-data (SIMD) computer operations.

6. The method of claim 1 wherein:

the character stream is a Unicode character stream comprised of a stream of 8-bit code units in UTF-8 format (UTF-8); and forming comprises forming 8 parallel property bit streams u8bit0(i) to u8bit7(i) wherein each bit stream corresponds to a single bit position within successive code units of the character stream.

7. The method of claim 6 wherein forming comprises:

carrying out three binary division transformations wherein each transformation divides up the character stream stream into two half-length output streams so that three such binary division transformations generate eight bit streams, each of one-eighth the length of the character stream.

8. The method of claim 6 wherein processing comprises:

forming a UTF-8 validity, property bit stream u8invalid(i) which identifies UTF-8 violations by performing Boolean and/or shifting operations on the 8 parallel property bit streams u8bit0(i) to u8bit7(i).

9. The method of claim 8 further comprising:

analyzing u8invalid(i) using a bit detection facility to detect an error; and if an error is detected, generating an error signal.

10. The method of claim 8 wherein forming u8invalid(i) comprises forming the following parallel property bit streams:

$u8\text{unibyte}(i) = \neg u8bit0(i)$ $u8\text{prefix}(i) = u8bit0(i) \wedge u8bit1(i)$ $u8\text{suffix}(i) = u8bit0(i) \wedge \neg u8bit1(i)$ $u8\text{prefix2}(i) = u8\text{prefix}(i) \wedge \neg u8bit2(i)$ $u8\text{prefix3or4}(i) = u8\text{prefix}(i) \wedge u8bit2(i)$ $u8\text{prefix3}(i) = u8\text{prefix3or4}(i) \wedge \neg u8bit3(i)$ $u8\text{prefix4}(i) = u8\text{prefix3or4}(i) \wedge u8bit3(i)$ $u8\text{badpfx2}(i) = u8\text{prefix2}(i) \wedge \neg(u8bit3(i) \vee u8bit4(i) \vee u8bit5(i) \vee u8bit6(i))$ $u8\text{badpfx4}(i) = u8\text{prefix4}(i) \wedge (u8bit4(i) \vee u8bit5(i) \vee (u8bit6(i) \vee u8bit7(i)))$ $u8\text{scope22}(i) = u8\text{prefix2}(i-1)$ $u8\text{scope32}(i) = u8\text{prefix3}(i-1)$ $u8\text{scope33}(i) = u8\text{prefix3}(i-2)$ $u8\text{scope42}(i) = u8\text{prefix4}(i-1)$ $u8\text{scope43}(i) = u8\text{prefix4}(i-2)$ $u8\text{scope44}(i) = u8\text{prefix4}(i-3)$ $u8\text{special}(i) = \begin{array}{l} \neg u8bit6 \wedge \neg (u8bit4(i) \oplus u8bit7(i)) \wedge \\ (u8bit3(i) \vee (\neg (u8bit4(i) \oplus u8bit5(i)))) \end{array}$ -continued $\text{anyscope}(i) = \begin{array}{l} u8scope22(i) \vee u8scope32(i) \vee u8scope33(i) \vee \\ u8scope42(i) \vee u8scope43(i) \vee u8scope44(i) \end{array}$ $u8\text{mismatch}(i) = \text{anyscope}(i) \oplus u8\text{suffix}(i)$ $u8\text{badsfx32}(i) = \begin{array}{l} u8scope32(i) \wedge u8special(i-1) \wedge \\ \neg (u8bit4(i-1) \oplus u8bit2(i)) \end{array}$ $u8\text{badsfx42}(i) = \begin{array}{l} u8scope42(i) \wedge u8special(i-1) \wedge \\ \neg (u8bit4(i-1) \oplus (u8bit2(i) \vee u8bit3(i))) \end{array}$ $u8\text{invalid}(i) = \begin{array}{l} u8badpfx2(i) \vee u8badpfx4(i) \vee u8mismatch(i) \vee \\ u8badsfx32(i) \vee u8badsfx42(i) \end{array}.$ 11. The method of claim 10 wherein one or more of the parallel property bit streams is formed utilizing SIMD computer instructions.

12. The method of claim 1 wherein:

the character stream is a Unicode character stream comprised of a stream of 16-bit code units in UTF-16 format;

forming comprises forming 16 parallel property bit streams u16bit0(i) to u16bit15(i) wherein each bit stream corresponds to a single bit position within two successive pairs of code units of the character stream; and processing comprises forming a UTF-16 validity, property bit stream u16invalid (i) which identifies UTF-16 violations by performing logical operations on the 16 parallel property bit streams u16bit0(i) to u16bit15(i); wherein u16invalid(i) is used for validating the UTF-16 character stream.

13. The method of claim 12 further comprising:

analyzing u16invalid(i) utilizing a bit detection facility to detect an error; and if an error is detected, generating an error signal.

14. The method of claim 13 wherein forming u16invalid(i) comprises forming the following parallel property bit streams:

$u16\text{surrogate}(i) = \begin{array}{l} u16bit0(i) \wedge u16bit1(i) \wedge \neg u16bit2(i) \wedge \\ u16bit3(i) \wedge u16bit4(i) \end{array}$ $u16\text{surrogatelo}(i) = u16\text{surrogate}(i) \wedge \neg u16bit5(i)$ $u16\text{surrogatehi}(i) = u16\text{surrogate}(i) \wedge u16bit5(i)$ $u16\text{invalid}(i) = u16\text{surrogatehi}(i) + u16\text{surrogatelo}(i-1).$ 15. The method of claim 14 wherein one or more of the parallel property bit streams is formed utilizing SIMD computer instructions.

16. The method of claim 1 wherein:

the character stream is a Unicode character stream comprised of a stream of 32-bit code units in UTF-32 format;

forming comprises forming 21 parallel property bit streams u32bit11(i) to u32bit31(i) wherein each bit stream corresponds to significant bits of the character stream; and processing comprises forming a UTF-32 validity, property bit stream u32invalid(i) which identifies UTF-32 violations by performing logical operations on several of parallel property bit streams u32bit11(i) to u32bit31(i); wherein u32invalid(i) is used for validating the UTF-32 character stream.

17. The method of claim 16 further comprising:
analyzing u32invalid(i) utilizing a bit detection facility to detect an error; and
if an error is detected, generating an error signal.

18. The method of claim 16 wherein forming u32invalid(i) comprises forming the following parallel property bit streams:

$$u32invalid(i) = \begin{matrix} \neg u32bit11(i) \land \neg u32bit12(i) \land \neg u32bit13(i) \land \\ \neg u32bit14(i) \land \neg u32bit15(i) \land \\ u32bit16(i) \land u32bit17(i) \land \neg u32bit18(i) \land \\ u32bit19(i) \land u32bit20(i) \end{matrix}$$

19. The method of claim 18 wherein one or more of the parallel property bit streams is formed utilizing SIMD computer instructions.

20. A method of decoding a Unicode character stream comprised of a stream of 8-bit code units in UTF-8 format (UTF-8):
forming 8 parallel property bit streams u8bit0(i) to u8bit7(i) wherein each bit stream corresponds to a single bit position within successive code units of the character stream; and
forming 8 parallel property bit streams cpbit0(i) to cpbit7(i), wherein each bit stream corresponds to a single bit position within successive code points, taken as bytes, represent code point values for the UTF-8 character stream, by performing Boolean and/or shifting operations on the 8 parallel property bit streams u8bit0(i) to u8bit7(i).

21. The method of decoding of claim 20 wherein forming cpbit0(i) to cpbit7(i) comprises forming the following parallel property bit streams:

$u8$unibyte$(i) = \neg u8$bit$0(i)$.

$u8$prefix$(i) = u8$bit$0(i) \char`\^ u8$bit$1(i)$ $u8$suffix$(i) = u8$bit$0(i) \char`\^ \neg u8$bit$1(i)$ $u8$prefix2$(i) = u8$prefix$(i) \char`\^ \neg u8$bit$2(i)$ $u8$prefix3or4$(i) = u8$prefix$(i) \char`\^ u8$bit$2(i)$ $u8$prefix3$(i) = u8$prefix3or4$(i) \char`\^ \neg u8$bit$3(i)$ $u8$prefix4$(i) = u8$prefix3or4$(i) \char`\^ u8$bit$3(i)$ $u8$scope22$(i) = u8$prefix2$(i-1)$ $u8$scope32$(i) = u8$prefix3$(i-1)$ $u8$scope33$(i) = u8$prefix3$(i-2)$ $u8$scope42$(i) = u8$prefix4$(i-1)$ $u8$scope43$(i) = u8$prefix4$(i-2)$ $u8$scope44$(i) = u8$prefix4$(i-3)$ $u8$lastsuffix$(i) = u8$scope22$(i) \lor u8$scope33$(i) \lor u8$scope44$(i)$ $u8$lastbyte$(i) = u8$lastsuffix$(i) \lor u8$unibyte$(i)$ $u8$butlastsuffix$(i) = u8$scope32$(i) \lor u8$scope43$(i)$ $u8$butlastbyte$(i) = u8$butlastsuffix$(i) \lor u8$prefix2$(i)$ $$cpbit0(i) = \begin{matrix} (u8lastsuffix(i) \land u8bit6(i-1)) \lor \\ (u8butlastsuffix(i) \land u8bit4(i-1)) \end{matrix}$$

$$cpbit1(i) = \begin{matrix} (u8\,lastsuffix(i) \land u8bit7(i-1)) \lor \\ (u8\,butlastsuffix(i) \land u8bit5(i-1)) \lor \\ (u8unibyte(i) \land u8bit1(i)) \end{matrix}$$

$$cpbit2(i) = \begin{matrix} (u8lastbyte(i) \land u8bit2(i)) \lor \\ (u8butlastsuffix(i) \land u8bit6(i-1)) \end{matrix}$$

$$cpbit3(i) = \begin{matrix} (u8\,lastbyte(i) \land u8bit3(i)) \lor \\ (u8\,butlastsuffix(i) \land u8bit7(i-1)) \lor \\ (u8scope42(i) \land u8bit5(i-1)) \end{matrix}$$

$$cpbit4(i) = \begin{matrix} (u8\,lastbyte(i) \land u8bit4(i)) \lor \\ (u8\,butlastsuffix(i) \land u8bit2(i)) \lor \\ (u8scope42(i) \land u8bit6(i-1)) \end{matrix}$$

$$cpbit5(i) = \begin{matrix} (u8\,lastbyte(i) \land u8bit5(i)) \lor \\ (u8\,butlastbyte(i) \land u8bit3(i)) \lor \\ (u8scope42(i) \land u8bit7(i-1)) \end{matrix}$$

$$cpbit6(i) = \begin{matrix} (u8\,lastbyte(i) \land u8bit6(i)) \lor \\ (u8\,butlastbyte(i) \land u8bit4(i)) \lor \\ (u8scope42(i) \land u8bit2(i)) \end{matrix}$$

$$cpbit7(i) = \begin{matrix} (u8\,lastbyte(i) \land u8bit7(i)) \lor \\ (u8\,butlastbyte(i) \land u8bit5(i)) \lor \\ (u8scope42(i) \land u8bit3(i)) \end{matrix}.$$

22. The method of claim 21 further comprising transposing the cpbit0(i) to cpbit7(i) bit streams to a byte stream.

23. The method of claim 22 wherein the step of transposing comprises carrying out three binary merging transformations wherein each transformation combines two input streams to produce one double-length output stream so that three such binary merging transformations generate one byte stream.

24. The method of claim 23 wherein one or more of the parallel property bit streams is formed utilizing SIMD computer instructions.

25. A method of transcoding a Unicode character stream comprised of a stream of 8-bit code units in UTF-8 format (UTF-8) to a UTF-16 representation:
forming, responsive to the character stream, a plurality of parallel property bit streams wherein each of the parallel property bit streams comprises bit values of a particular property associated with data values of the character stream;
transcoding by forming one or more further property streams by operating on one or more of the parallel property bit streams to perform the transcoding.

26. The method of claim 25 wherein transcoding comprises operating on a multiplicity of bits in the one or more parallel property bits streams at the same time.

27. The method of claim 26 wherein operating on a multiplicity of bits comprises using simultaneous-instruction, multiple-data (SIMD) computer operations.

28. The method of claim 27 wherein operating comprises carrying out Boolean operations and/or shifting operations on one or more of the parallel property bit streams.

29. A module that comprises:
a character stream application module;
a parallel property bit stream module;
an analysis module; wherein;

the character stream application module applies a character stream received from the module as input to the parallel property bit stream module;

the parallel property bit stream module forms a plurality of parallel property bit streams wherein each of the parallel property bit streams comprises bit values of a particular property associated with data values of the character stream; and the analysis module processes the parallel property bit streams.

30. The module of claim 29 which further comprises a character stream generator, wherein:

the analysis module outputs one or more parallel property bits streams; and the character stream generator generates a character stream.

31. The module of claim 30 which further comprises a character stream receiver, wherein the character stream is applied as input to the character stream receiver.

32. The module of claim 31 wherein the module is an operating system or a library service package.

33. The module of claim 31 wherein the module is a network appliance.

34. The module of claim 31 wherein the module is a word processor.

35. The module of claim 31 wherein the module is a text acquisition system.

36. The module of claim 31 wherein the module is a database system.

37. The module of claim 31 wherein the module is a virtual machine or a run-time environment.

38. The module of claim 31 wherein the module is an XML processor.

39. The module of claim 31 wherein the module is an office application including one or more of a word processor, spreadsheet software, database software, or presentation software.

40. The module of claim 31 wherein the module is a portable communication device including one or more of a cellphone, a personal digital assistant or a wireless e-mail device.

41. The module of claim 29 wherein the analysis module validates the character stream.

42. The module of claim 29 wherein the analysis module decodes the character stream.

43. The module of claim 29 wherein the analysis module transcodes the character stream. system.

44. A computer readable medium comprising a program for controlling a computer to execute:

forming, responsive to a character stream, a plurality of parallel property bit streams wherein each of the parallel property bit streams comprises bit values of a particular property associated with data values of the character stream; and processing the one or more parallel property bit streams.

45. A method for processing a character stream comprising:

forming, responsive to the character stream, a number of parallel property bit streams wherein each of the parallel property bit streams comprises bit values of a particular property associated with data values of the character stream and wherein the number is such that there is one bit stream for each bit in a code unit of the character stream; and processing the one or more parallel property bit streams.

46. The method of claim 45 wherein processing comprises:

forming one or more further property streams by operating on one or more of the parallel property bit streams.

47. The method of claim 45 wherein processing comprises operating on a multiplicity of bits in the one or more parallel property bits streams at the same time.

48. The method of claim 47 wherein operating on a multiplicity of bits comprises using simultaneous-instruction, multiple-data (SIMD) computer operations.

49. The method of claim 47 wherein operating comprises carrying out Boolean operations and/or shifting operations on one or more of the parallel property bit streams.

50. A method for processing a basis character stream C, wherein C(i) denotes the character code unit at position i within the stream, comprising:

forming, responsive to the basis character stream, a plurality of parallel property bit streams $P_j$ wherein each bit $P_j(i)$ of the parallel property bit streams $P_j$ represents a Boolean property associated with code unit C(i) of the basis character stream;

segmenting the parallel property bit streams into blocks, each block consisting of bit values $P_j(i)$ at a multiplicity of positions i; and processing the blocks.

51. The method of claim 50 wherein processing comprises:

forming blocks of one or more further parallel property bit streams $P_m$ from corresponding blocks of parallel property bit streams $P_j$ and $P_k$ by simultaneously applying binary Boolean operations to determine $P_m(i)$ in terms of $P_j(i)$ and $P_k(i)$ for positions i within each block; and further processing the blocks.

52. The method of claim 51 wherein processing comprises:

forming blocks of one or more scope streams $P_s$ that represent expected properties of code unit C(i) in terms of properties $P_j$ of prior code units C(i−s) by applying bit shift operations to shift forward the bits within blocks of bit stream $P_j$ by s bit positions; and further processing the blocks.

53. The method of claim 52 wherein processing comprises:

forming blocks of one or more further parallel property streams by simultaneously applying binary Boolean operations to scope streams and other parallel property bit streams; and further processing the blocks.

54. The method of claim 53 wherein the character stream is encoded in a variable-length character encoding scheme such that the number of code units per character varies depending on the particular character being encoded.

55. The method of claim 54 wherein the character encoding scheme is UTF-8; and forming comprises forming 8 parallel property bit streams u8bit0(i) to u8bit7(i) wherein each bit stream corresponds to a single bit position within successive code units of the character stream.

56. The method of claim 55 wherein processing comprises:

forming a UTF-8 validity, property bit stream u8invalid (i) which identifies UTF-8 violations by performing Boolean and/or shifting operations on the 8 parallel property bit streams u8bit0(i) to u8bit7(i).

57. The method of claim 56 wherein forming u8invalid(i) comprises forming parallel property bit streams in accord with two or more of the following equations:

$$u8unibyte(i) = \neg u8bit0(i)$$

$$u8prefix(i) = u8bit0(i) \wedge u8bit1(i)$$

$$u8suffix(i) = u8bit0(i) \wedge \neg u8bit1(i)$$

$u8\text{prefix2}(i) = u8\text{prefix}(i) \char94 \neg u8\text{bit2}(i)$ $u8\text{prefix3or4}(i) = u8\text{prefix}(i) \char94 u8\text{bit2}(i)$ $u8\text{prefix3}(i) = u8\text{prefix3or4}(i) \char94 \neg u8\text{bit3}(i)$ $u8\text{prefix4}(i) = u8\text{prefix3or4}(i) \char94 u8\text{bit3}(i)$ $$u8badpfx2(i) = \frac{u8prefix2(i) \wedge}{\neg(u8bit3(i) \vee u8bit4(i) \vee u8bit5(i) \vee u8bit6(i))}$$

$$u8badpfx4(i) = \frac{u8prefix4(i) \wedge}{(u8bit4(i) \vee u8bit5(i) \wedge (u8bit6(i) \vee u8bit7(i)))}$$

$u8\text{scope22}(i) = u8\text{prefix2}(i-1)$ $u8\text{scope32}(i) = u8\text{prefix3}(i-1)$ $u8\text{scope33}(i) = u8\text{prefix3}(i-2)$ $u8\text{scope42}(i) = u8\text{prefix4}(i-1)$ $u8\text{scope43}(i) = u8\text{prefix4}(i-2)$ $u8\text{scope44}(i) = u8\text{prefix4}(i-3)$ $u8\text{special}(i) = \neg u8\text{bit6}(i) \char94$
$\quad \neg(u8\text{bit4}(i) + u8\text{bit7}(i)) \char94 (u8\text{bit3}(i) \vee (\neg(u8\text{bit4}(i) + u8\text{bit5}(i))))$ $\text{anyscope}(i) = u8\text{scope22}(i) \vee u8\text{scope32}(i)$
$\quad \vee u8\text{scope33}(i) \vee u8\text{scope42}(i) \vee u8\text{scope43}(i)$
$\quad \vee u8\text{scope44}(i)$ $u8\text{mismatch}(i) = \text{anyscope}(i) + u8\text{suffix}(i)$ $u8\text{badsfx32}(i) = u8\text{scope32}(i) \char94 u8\text{special}(i-1) \char94 \neg(u8\text{bit4}(i-1) + u8\text{bit2}(i))$ $u8\text{badsfx42}(i) = u8\text{scope42}(i) \char94 u8\text{special}(i-1) \char94$
$\quad \neg(u8\text{bit4}(i-1) + (u8\text{bit2}(i) \vee u8\text{bit3}(i)))$ $u8\text{invalid}(i) = u8\text{badpfx2}(i) \vee u8\text{badpfx4}(i)$
$\quad \vee u8\text{mismatch}(i) \vee u8\text{badsfx32}(i) \vee u8\text{badfx42}(i).$

58. The method of claim 51 wherein processing comprises:
forming blocks of one or more streams $P_1$ (lookahead streams) that represent expected properties of code unit C(i) in terms of properties $P_1$ of following code units C(i+s) by applying bit shift operations to shift back the bits within blocks of bit stream $P_1$ by s bit positions; and
further processing the blocks.

59. The method of claim 58 wherein processing comprises:
forming blocks of one or more further parallel property streams by simultaneously applying binary Boolean operations to lookahead streams and other parallel property bit streams; and
further processing the blocks.

60. The method of claim 51 wherein:
one or more further parallel property bit streams comprise the individual bit streams of an output character stream T; and
processing comprises forming the code units of T from the further parallel property bit streams.

61. The method of claim 60 wherein a further parallel property bit stream comprises a deletion mask bit stream D; and
processing comprises compressing one or more further parallel property bit streams by deleting bits at positions marked in D; and
forming the code units of T comprises forming code units from the further property bit streams resulting after deleting bits marked in D.

62. The method of claim 61 wherein the code units of C are encoded in accord with UTF-8 and the code units of T are encoded in accord with UTF-16.

63. The method of claim 60 wherein the code units of C are encoded in accord with one character encoding scheme, and the code units of T are encoded using a second character encoding scheme.

64. The method of claim 61 wherein deletion of bits at positions marked in D is carried out using SIMD (simultaneous-instruction multiple-data) operations.

65. The method of claim 51 wherein forming comprises:
using SIMD (simultaneous-instruction multiple-data) operations to carry out three binary division transformations wherein each transformation divides up the character stream into two half-length output streams so that three such binary division transformations generate eight bit streams, each of one-eighth the length of the character stream.

* * * * *